(12) United States Patent
Nogami et al.

(10) Patent No.: US 10,581,559 B2
(45) Date of Patent: Mar. 3, 2020

(54) USER EQUIPMENT, BASE STATIONS AND METHODS

(71) Applicants: Sharp Kabushiki Kaisha, Sakai-ku, Sakai, Osaka (JP); FG Innovation Company Limited, New Territories, Hong Kong (CN)

(72) Inventors: Toshizo Nogami, Vancouver, WA (US); Zhanping Yin, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/649,894

(22) Filed: Jul. 14, 2017

(65) Prior Publication Data

US 2018/0019844 A1 Jan. 18, 2018

Related U.S. Application Data

(60) Provisional application No. 62/363,728, filed on Jul. 18, 2016.

(51) Int. Cl.
*H04L 1/18* (2006.01)
*H04L 5/00* (2006.01)
*H04L 1/00* (2006.01)

(52) U.S. Cl.
CPC .......... *H04L 1/1812* (2013.01); *H04L 1/1854* (2013.01); *H04L 5/0055* (2013.01); *H04L 1/008* (2013.01); *H04L 5/0007* (2013.01)

(58) Field of Classification Search
CPC ... H04L 1/1812; H04L 5/0055; H04L 1/1854; H04L 1/008
See application file for complete search history.

(56) References Cited

U.S. PATENT DOCUMENTS

| | | | |
|---|---|---|---|
| 8,724,722 B2 | 5/2014 | Gazit et al. | |
| 2013/0051342 A1* | 2/2013 | Aiba | H04L 1/1893 370/329 |
| 2014/0201586 A1 | 7/2014 | Pajukoski et al. | |

(Continued)

OTHER PUBLICATIONS

International Search Report and Written Opinion issued for PCT Application No. PCT/US2017/042413 dated Oct. 6, 2017.

(Continued)

*Primary Examiner* — Thien Nguyen
(74) *Attorney, Agent, or Firm* — Austin Rapp

(57) ABSTRACT

A user equipment (UE) is described. A higher-layer processor is configured to configure a short processing time. A physical downlink control channel (PDCCH) receiver is configured to receive, in a subframe n, a PDCCH. A physical downlink shared channel (PDSCH) receiver is configured to receive, in the subframe n, a PDSCH corresponding to the PDCCH. An uplink receiver is configured to feedback, in a subframe n+k, a hybrid automatic repeat request-acknowledgement (HARQ-ACK) corresponding to the PDSCH. In a case that the PDCCH is a PDCCH in common search space, the k is equal to $k_1$. In a case that the PDCCH is a PDCCH in UE-specific search space, the k is equal to $k_2$. The $k_2$ is smaller than the $k_1$.

4 Claims, 16 Drawing Sheets

(56) References Cited

U.S. PATENT DOCUMENTS

2014/0357272 A1\* 12/2014 Axmon ................ H04W 48/12
 455/434
2015/0124671 A1 5/2015 Tabet et al.
2017/0290008 A1 10/2017 Tooher et al.
2017/0331670 A1\* 11/2017 Parkvall ............... H04J 11/0079

OTHER PUBLICATIONS

KDDI, "Discussion on PUCCH design for shortened TTI", 3GPP TSG RAN WG1 Meeting #85, Nanjing, China, R1-165267, May 27, 2016.
LG Electronics, "Processing time reduction for latency reduction", 3GPP TSG RAN WG1 Meeting #85, Nanjing, China, R1-165429, May 27, 2016.
Mediatek Inc., "Search Spaces Design for ePDCCH", 3GPP TSG-RAN WG1 #68bis, Jeju, Korea, R1-121172, Mar. 30, 2012.
Ericsson, Huawei, "New SI proposal: Study on Latency reduction techniques for LTE," 3GPP TSG-RAN WG1 Meeting #67, Shanghai, China, RP-150465, Mar. 12, 2015.
Ericsson, "New Work Item on shortened TTI and processing time for LTE," 3GPP TSG RAN Meeting #72, Busan, Korea, RP-161299, Jun. 16, 2016.
3GPP TS 36.211. v13.0.0, Evolved Universal Terrestrial Radio Access (E-UTRA); Physical channels and modulation (Release 13), Dec. 2015.
3GPP TR 36.881 v14.0.0, "Study on latency reduction techniques for LTE (Release 14)," Jun. 2016.
Office Action issued for U.S. Appl. No. 15/649,875 dated Dec. 4, 2018.
Non-Compliant Amendment issued for U.S. Appl. No. 15/649,875 dated Mar. 22, 2019.
Office Action issued for U.S. Appl. No. 15/649,875 dated Jul. 29, 2019.

\* cited by examiner

USER EQUIPMENT, BASE STATIONS AND METHODS

RELATED APPLICATIONS

This application is related to and claims priority from U.S. Provisional Patent Application No. 62/363,728, entitled "USER EQUIPMENTS, BASE STATIONS AND METHODS," filed on Jul. 18, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
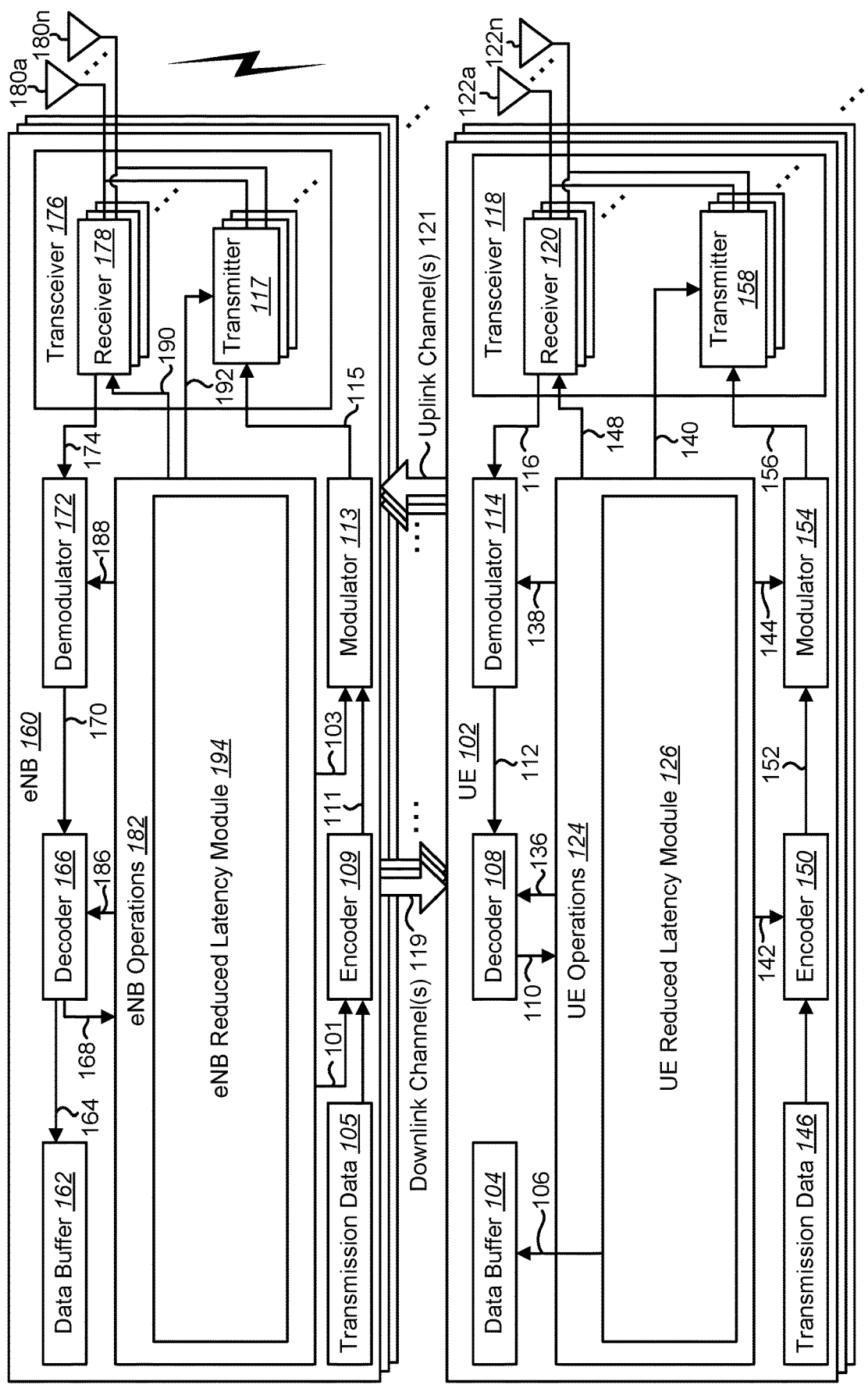
FIG. 1 is a block diagram illustrating one implementation of one or more evolved NodeBs (eNBs) and one or more user equipments (UEs) in which systems and methods for low latency radio communications may be implemented.

A user equipment (UE) is described. A higher-layer processor is configured to configure a short processing time. A physical downlink control channel (PDCCH) receiver is configured to receive, in a subframe n, a PDCCH. A physical downlink shared channel (PDSCH) receiver is configured to receive, in the subframe n, a PDSCH corresponding to the PDCCH. An uplink receiver is configured to feedback, in a subframe n+k, a hybrid automatic repeat request-acknowledgement (HARQ-ACK) corresponding to the PDSCH. In a case that the PDCCH is a PDCCH in common search space, the k is equal to $k_1$. In a case that the PDCCH is a PDCCH in UE-specific search space, the k is equal to $k_2$. The $k_2$ is smaller than the $k_1$.

An evolved node B (eNB) is also described. A higher-layer processor is configured to configure, for a UE, a short processing time. A PDCCH transmitter is configured to transmit, in a subframe n, a PDCCH. A PDSCH transmitter is configured to transmit, in the subframe n, a PDSCH corresponding to the PDCCH. An uplink receiver is configured to obtain, in a subframe n+k, a HARQ-ACK corresponding to the PDSCH. In a case that the PDCCH is a PDCCH in common search space, the k is equal to $k_1$. In a case that the PDCCH is a PDCCH in UE-specific search space, the k is equal to $k_2$. The $k_2$ is smaller than the $k_1$.

A method for a UE is also described. The method includes configuring a short processing time. The method also includes receiving, in a subframe n, a PDCCH. The method further includes receiving, in the subframe n, a PDSCH corresponding to the PDCCH. The method additionally includes feeding back, in a subframe n+k, a HARQ-ACK corresponding to the PDSCH. In a case that the PDCCH is a PDCCH in common search space, the k is equal to $k_1$. In a case that the PDCCH is a PDCCH in UE-specific search space, the k is equal to $k_2$. The $k_2$ is smaller than the $k_1$.

A method for an eNB is also described. The method includes configuring, for a UE, a short processing time. The method also includes transmitting, in a subframe n, a PDCCH. The method further includes transmitting, in the subframe n, a PDSCH corresponding to the PDCCH. The method additionally includes obtaining, in a subframe n+k, a HARQ-ACK corresponding to the PDSCH. In a case that the PDCCH is a PDCCH in common search space, the k is equal to $k_1$. In a case that the PDCCH is a PDCCH in UE-specific search space, the k is equal to $k_2$. The $k_2$ is smaller than the $k_1$.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same time division duplexing (TDD) uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Packet data latency is a performance metric of a communication system. There is a requirement to reduce the latency from the view point of the perceived responsiveness of the system for new features (e.g., real-time communication for robotics applications) as well as the more efficient transactions of the current HTTP/TCP-based packets. In addition, it is said that the Tactile Internet, which will have significant impacts on future business, market and human lives, needs extremely reduced latency signals. The Tactile Internet could be provided through the same band as the current cellular communication, a different band (e.g., a higher frequency band such as a millimeter wave) or both of them.

A promising candidate for realizing the latency reduction is shortened Round Trip Time (RTT). However, coexistence of normal and shortened RTTs has not been defined.

The systems and method described herein provide flexible fallback to normal RTT communication when shortened RTT is configured. Typical configuration is as follows. In a case that PDCCH for a PDSCH transmission is transmitted/received in common search space, the HARQ-ACK of the corresponding PDSCH is fed back/obtained based on normal RTT timeline. In a case that PDCCH/enhanced physical downlink control channel (EPDCCH) for a PDSCH transmission is transmitted/received in UE-specific search space, the HARQ-ACK of the corresponding PDSCH is fed back/obtained based on a reduced RTT timeline. In a case that PDCCH for a PUSCH scheduling is transmitted/received in common search space, the transmission of the corresponding PUSCH is performed based on a normal RTT timeline. In a case that PDCCH/EPDCCH for a PUSCH scheduling is transmitted/received in UE-specific search space, the transmission of the corresponding PUSCH is performed based on reduced RTT timeline.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for low latency radio communications may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a UE reduced latency module 126.

Downlink and uplink transmissions may be organized into radio frames with a 10 millisecond (ms) duration. For a frame structure Type 1 (e.g., frequency division duplexing (FDD)), each 10 ms radio frame is divided into ten equally sized sub-frames. Each sub-frame consists of two equally sized slots. For a frame structure Type 2 (e.g., TDD), each 10 ms radio frame consists of two half-frames of 5 ms each. Each half-frame consists of eight slots of length 0.5 ms and three special fields: DwPTS, guard period (GP) and UpPTS. The length of DwPTS and UpPTS is configurable subject to the total length of DwPTS, GP and UpPTS being equal to 1 ms. Additional details about frame structure are discussed in connection with FIG. 5.

Both 5 ms and 10 ms switch-point periodicity are supported. Subframe 1 in all configurations and subframe 6 in a configuration with 5 ms switch-point periodicity consist of DwPTS, GP and UpPTS. Subframe 6 in a configuration with 10 ms switch-point periodicity consists of DwPTS only. All other subframes consist of two equally sized slots.

In LTE license access, subframes are classified into 2 types of subframes. One is the normal subframe that contains only either one of DL transmission and UL transmission. LTE license access with FDD has only the normal subframe. The other is the special subframe that contains three fields DwPTS, GP and UpPTS. DwPTS and UpPTS are durations reserved for DL transmission and UL transmission, respectively.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 Orthogonal Frequency Division Multiplexing (OFDM) symbols. UpPTS consists of 1 single carrier frequency-division multiple access (SC-FDMA) symbol.

2) Special subframe configuration 1: DwPTS consists of 9 OFDM symbols for normal cyclic prefix (CP) and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Frame structure Type 3 may be applicable to Licensed-Assisted Access (LAA) secondary cell operation with normal cyclic prefix only. The 10 subframes within a radio frame are available for downlink transmissions. Downlink transmissions occupy one or more consecutive subframes, starting anywhere within a subframe and ending with the last subframe either fully occupied or one of the DwPTS durations and structures.

For a UE 102 not capable of UL LAA, if the UE 102 is configured with a LAA SCell, the UE 102 may apply physical layer procedures assuming frame structure type 1 for the LAA SCell unless stated otherwise.

In the downlink, the OFDM access scheme may be employed. In the downlink, PDCCH, EPDCCH, PDSCH and the like may be transmitted. A downlink radio frame may consist of multiple pairs of downlink resource blocks (RBs). The downlink RB pair is a unit for assigning downlink radio resources, defined by a predetermined bandwidth (RB bandwidth) and a time slot. Two slots (i.e., slot0 and slot1) equal one subframe. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid is discussed in connection with FIG. 6.

In the uplink, a Single-Carrier Frequency Division Multiple Access (SC-FDMA) access scheme may be employed. In the uplink, PUCCH, PDSCH, Physical Random Access Channel (PRACH) and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. Two slots (i.e., slot0 and slot1) equal one subframe. The uplink RB pair consists of two uplink RBs that are continuous in the time domain.

The uplink RB may consist of twelve sub-carriers in frequency domain and seven (for normal CP) or six (for extended CP) SC-FDMA symbols in time domain. A region defined by one sub-carrier in the frequency domain and one SC-FDMA symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 7.

In Carrier Aggregation (CA), two or more CCs may be aggregated to support wider transmission bandwidths (e.g., up to 100 MHz, beyond 100 MHz). A UE 102 may simultaneously receive or transmit on one or multiple CCs. Serving cells can be classified into a primary cell (PCell) and a secondary cell (SCell).

The primary cell may be the cell, operating on the primary frequency, in which the UE 102 either performs the initial connection establishment procedure or initiates the connection re-establishment procedure, or the cell indicated as the primary cell in the handover procedure. The secondary cell may be a cell, operating on a secondary frequency, which may be configured once an Radio Resource Control (RRC) connection is established and which may be used to provide additional radio resources.

In the downlink, the carrier corresponding to the PCell is the downlink primary component carrier (DL PCC) while in the uplink it is the uplink primary component carrier (UL PCC). Similarly, in the downlink, the carrier corresponding to the SCell is the downlink secondary component carrier (DL SCC) while in the uplink it is the uplink secondary component carrier (UL SCC). The UE 102 may apply a system information acquisition (i.e., acquisition of broadcast system information) and change monitoring procedures for the PCell. For an SCell, E-UTRAN may provide, via dedicated signaling, all system information relevant for operation in an RRC_CONNECTED message when adding the SCell.

In Dual Connectivity (DC), each of two or more serving cells may belong to either one of a master cell group (MCG) or a secondary cell group (SCG). The MCG is associated with a master eNB (MeNB) while the SCG is associated with a secondary eNB (SeNB).

DC operation may be configured to utilize radio resources provided by two distinct schedulers, located in the MeNB and SeNB. In the case of DC, the UE 102 may be configured with two Medium Access Control (MAC) entities: one MAC entity for MeNB and one MAC entity for SeNB.

When a UE 102 is configured with CA in the MCG, CA principles may generally apply to the MCG. For the SCG, at least one cell in the SCG has a configured UL CC and one of them, named the primary secondary cell (PSCell), is configured with physical uplink control channel (PUCCH) resources. Unlike the CA for which a UE 102 should cope with a delay spread of up to 30.26 µs among the component carriers, two operations are defined for the DC: synchronous and asynchronous DC. In synchronous DC operation, the UE 102 can cope with a maximum reception timing difference up to at least 33 µs between cell groups (CGs). In asynchronous DC operation, the UE 102 can cope with a maximum reception timing difference up to 500 µs between CGs.

Even in the case that DC is not configured, one or more PUCCH cell group(s) can be configured. A PUCCH cell group having a PCell may be referred to as a MCG or master PUCCH cell group (MPCG). The other cell group(s) may be referred to as a SCG or secondary PUCCH cell group (SPCG). Each SCG (or SPCG) may include a primary secondary cell (PSCell), on which a PUCCH transmission(s) for the SCG (or SPCG) can be performed.

A downlink physical channel may correspond to a set of resource elements carrying information originating from higher layers. The following downlink physical channels may be defined. A physical downlink shared channel (PDSCH) may carry a transport block provided by a higher layer. The transport block may contain user data, higher layer control messages, physical layer system information. The scheduling assignment of PDSCH in a given subframe may normally be carried by PDCCH or EPDCCH in the same subframe.

A physical broadcast channel (PBCH) may carry a master information block, which is required for an initial access.

A physical multicast channel (PMCH) may carry Multimedia Broadcast Multicast Services (MBMS) related data and control information.

A physical control format indicator channel (PCFICH) may carry a control format indicator (CFI) specifying the number of OFDM symbols on which PDCCHs are mapped.

A physical downlink control channel (PDCCH) may carry a scheduling assignment (also referred to as a DL grant) or an UL grant. The PDCCH may be transmitted via the same antenna port (e.g., cell-specific reference signal (CRS) port) as the PBCH.

A physical hybrid ARQ indicator channel (PHICH) may carry UL-associated HARQ-ACK information.

An enhanced physical downlink control channel (EPDCCH) may carry a scheduling assignment or an UL grant. The EPDCCH may be transmitted via a different antenna port (e.g., Demodulation reference signal (DM-RS) port) from the PBCH and PDCCH. Possible REs on which EPDCCHs are mapped may be different from those for PDCCH, though they may partially overlap.

A downlink physical signal may correspond to a set of resource elements used by the physical layer but may not carry information originating from higher layers.

A cell-specific reference signal (CRS) may be assumed to be transmitted in all downlink subframes and DwPTS. For a normal subframe with normal CP, a CRS may be mapped on REs that are located in the 1st, 2nd, and 5th OFDM symbols in each slot. A CRS may be used for demodulation of the PDSCH, Channel State Information (CSI) measurement and Radio Resource Management (RRM) measurement.

A CSI reference signal (CSI-RS) may be transmitted in the subframes that are configured by higher layer signaling. The REs on which a CSI-RS is mapped are also configured by higher layer signaling. A CSI-RS may be further classified into non zero power (NZP) CSI-RS and ZP (zero power) CSI-RS. A part of a ZP CSI-RS resources may be configured as a CSI interference measurement (CSI-IM) resource, which may be used for interference measurement.

A UE-specific RS (UE-RS) may be assumed to be transmitted in Physical Resource Block (PRB) pairs that are allocated for the PDSCH intended to the UE 102. UE-RS may be used for demodulation of the associated PDSCH.

A Demodulation RS (DM-RS) may be assumed to be transmitted in PRB pairs that are allocated for EPDCCH transmission. DM-RS may be used for demodulation of the associated EPDCCH.

Primary/secondary synchronization signals may be transmitted to facilitate the UE's 102 cell search, which is the procedure by which the UE 102 acquires time and frequency synchronization with a cell and detects the physical layer Cell ID of that cell. E-UTRA cell search supports a scalable overall transmission bandwidth corresponding to 6 resource blocks and upwards.

A discovery signal may consist of CRS, primary/secondary synchronization signals NZP-CSI-RS (if configured). The UE 102 may assume a discovery signal occasion once every discovery reference signal (DRS) measurement timing configuration (DMTC)-Periodicity. The eNB 160 using cell on/off may adaptively turn the downlink transmission of a cell on and off. A cell whose downlink transmission is turned off may be configured as a deactivated SCell for a UE 102. A cell performing on/off may transmit only periodic discovery signals and UEs 102 may be configured to measure the discovery signals for RRM. A UE 102 may perform RRM measurement and may discover a cell or transmission point of a cell based on discovery signals when the UE 102 is configured with discovery-signal-based measurements.

Uplink physical channels and uplink physical signals are also described herein. An uplink physical channel may correspond to a set of resource elements carrying information originating from higher layers. The following uplink physical channels may be defined. A Physical Uplink Shared Channel (PUSCH) may carry a transport block provided by a higher layer. The transport block may contain user data and/or higher layer control messages. An uplink grant of PUSCH in a given subframe may normally be carried by PDCCH or EPDCCH several subframes before the given subframe. A Physical Uplink Control Channel (PUCCH) may carry DL-associated HARQ-ACK information, a scheduling request, and/or CSI. A Physical Random Access Channel (PRACH) may carry a random access preamble.

An uplink physical signal may correspond to a set of resource elements used by the physical layer but may not carry information originating from higher layers. Reference signals (RS) are described herein. A PUSCH DM-RS (Demodulation RS) may be assumed to be transmitted in PRB pairs that are allocated for the PUSCH transmitted by the UE 102. PUSCH DM-RS may be used for demodulation of the associated PUSCH. PUSCH DM-RS may be mapped on REs that are located in the 4th SC-FDMA symbol in each slot.

PUCCH DM-RS (Demodulation RS) may be assumed to be transmitted in PRB pairs that are allocated for the PUCCH transmitted by the UE 102. PUCCH DM-RS may be used for demodulation of the associated PUCCH. For PUCCH format 1, 1a and 1b, PUCCH DM-RS may be mapped on REs which are located in the 3rd, 4th and 5th SC-FDMA symbols in each slot. For PUCCH format 2, 2a, 2b and 3, PUCCH DM-RS may be mapped on REs that are located in the 2nd and 6th SC-FDMA symbols in each slot. For PUCCH format 4 and 5, PUCCH DM-RS may be mapped on REs that are located in the 4th SC-FDMA symbol in each slot.

A sounding RS (SRS) may be transmitted in the last SC-FDMA symbol in uplink subframe or in 1 of 2 SC-FDMA symbol(s) in UpPTS.

A UE sounding procedure is also described herein. A UE 102 may transmit SRS on serving cell SRS resources based on two trigger types: trigger type 0 (higher layer signaling); or trigger type 1 (downlink control information (DCI) formats 0/4/1A for FDD and TDD and DCI formats 2B/2C/2D for TDD). In case both trigger type 0 and trigger type 1 SRS transmissions would occur in the same subframe in the same serving cell, the UE 102 may only transmit the trigger type 1 SRS transmission.

A UE 102 may be configured with SRS parameters for trigger type 0 and trigger type 1 on each serving cell. For trigger type 0, only a single set of SRS parameters may be used. For trigger type 1 and DCI format 4, three sets of SRS parameters (e.g., srs-ConfigApDCI-Format4) may be configured by higher layer signaling. The 2-bit SRS request field in DCI format 4 indicates the SRS parameter set given in Table 1. For trigger type 1 and DCI format 0, a single set of SRS parameters (e.g., srs-ConfigApDCI-Format0) may be configured by higher layer signaling. For trigger type 1 and DCI formats 1A/2B/2C/2D, a single common set of SRS parameters (e.g., srs-ConfigApDCI-Format1a2b2c) may be configured by higher layer signaling. The SRS request field may be 1 bit for DCI formats 0/1A/2B/2C/2D, with a type 1 SRS triggered if the value of the SRS request field is set to "1".

A 1-bit SRS request field may be included in DCI formats 0/1A for frame structure type 1 and 0/1A/2B/2C/2D for frame structure type 2 if the UE 102 is configured with SRS parameters for DCI formats 0/1A/2B/2C/2D by higher-layer signaling. Table 1 provides an SRS request value for trigger type 1 in DCI format 4.

TABLE 1

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Trigger type 0 SRS configuration of a UE 102 in a serving cell for SRS periodicity ($T_{SRS}$) and SRS subframe offset ($T_{offset}$) may be derived using higher layer parameter $I_{SRS}$. The periodicity $T_{SRS}$ of the SRS transmission is serving cell specific and may be selected from the set {2, 5, 10, 20, 40, 80, 160, 320} ms or subframes. For the SRS periodicity $T_{SRS}$ of 2 ms in TDD serving cell, two SRS resources may be configured in a half frame containing UL subframe(s) of the given serving cell.

Trigger type 1 SRS configuration of a UE 102 in a serving cell for SRS periodicity ($T_{SRS,1}$) and SRS subframe offset ($T_{offset,1}$) may be derived using higher layer parameter $I_{SRS}$. The periodicity $T_{SRS,1}$ of the SRS transmission is serving cell specific and may be selected from the set {2, 5, 10} ms or subframes. For the SRS periodicity $T_{SRS,1}$ of 2 ms in TDD serving cell, two SRS resources may be configured in a half frame containing UL subframe(s) of the given serving cell.

In Rel-12, there are ten transmission modes. These transmission modes may be configurable for an LAA SCell. These transmission modes are illustrated in Table 2.

TABLE 2

| Transmission mode | DCI format | Transmission scheme |
|---|---|---|
| Mode 1 | DCI format 1A | Single antenna port |
|  | DCI format 1 | Single antenna port |
| Mode 2 | DCI format 1A | Transmit diversity |
|  | DCI format 1 | Transmit diversity |
| Mode 3 | DCI format 1A | Transmit diversity |
|  | DCI format 2A | Large delay Cyclic Delay Diversity (CDD) or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user Multiple-Input Multiple-Output (MIMO) |
| Mode 6 | DCI format 1A | Transmit diversity |
|  | DCI format 1B | Closed-loop spatial multiplexing using a single transmission layer |
| Mode 7 | DCI format 1A | Single-antenna port (for a single CRS port), transmit diversity (otherwise) |
|  | DCI format 1 | Single-antenna port |
| Mode 8 | DCI format 1A | Single-antenna port (for a single CRS port), transmit diversity (otherwise) |
|  | DCI format 2B | Dual layer transmission or single-antenna port |
| Mode 9 | DCI format 1A | Single-antenna port (for a single CRS port or Multimedia Broadcast Single Frequency Network (MBSFN) subframe), transmit diversity (otherwise) |
|  | DCI format 2C | Up to 8 layer transmission or single-antenna port |
| Mode 10 | DCI format 1A | Single-antenna port (for a single CRS port or MBSFN subframe), transmit diversity (otherwise) |
|  | DCI format 2D | Up to 8 layer transmission or single-antenna port |

DCI format 1, 1A, 1B, 1C, 1D, 2, 2A, 2B, 2C, and 2D may be used for DL assignment (also referred to as DL grant). DCI format 0, and 4 may be used for UL grant. The DCI formats are illustrated in Table 3.

TABLE 3

| DCI format | Use |
|---|---|
| DCI format 0 | scheduling of PUSCH in one UL cell |
| DCI format 1 | scheduling of one PDSCH codeword in one cell |
| DCI format 1A | compact scheduling of one PDSCH codeword in one cell and random access procedure initiated by a PDCCH order |
| DCI format 1B | compact scheduling of one PDSCH codeword in one cell with precoding information |
| DCI format 1C | very compact scheduling of one PDSCH codeword, notifying Multicast Control Channel (MCCH) change, reconfiguring TDD, and LAA common information |
| DCI format 1D | compact scheduling of one PDSCH codeword in one cell with precoding and power offset information |
| DCI format 1A | Transmit diversity |
| DCI format 2 | scheduling of up to two PDSCH codewords in one cell with precoding information |
| DCI format 2A | scheduling of up to two PDSCH codewords in one cell |
| DCI format 2B | scheduling of up to two PDSCH codewords in one cell with scrambling identity information |
| DCI format 2C | scheduling of up to two PDSCH codewords in one cell with antenna port, scrambling identity and number of layers information |
| DCI format 2D | scheduling of up to two PDSCH codewords in one cell with antenna port, scrambling identity and number of layers information and PDSCH RE Mapping and Quasi-Co-Location Indicator (PQI) information |
| DCI format 3 | transmission of transmitter power control (TPC) commands for PUCCH and PUSCH with 2-bit power adjustments |
| DCI format 3A | transmission of TPC commands for PUCCH and PUSCH with single bit power adjustments |
| DCI format 4 | of PUSCH in one UL cell with multi-antenna port transmission mode |
| DCI format 5 | scheduling of Physical Sidelink Broadcast Channel (PSCCH), and also contains several Sidelink Control Information (SCI) format 0 fields used for the scheduling of Physical Sidelink Shared Channel (PSSCH) |

DCI format 1, 1A, 1B, 1C, 1D may include the bit fields provided in Table 4, where $N^{DL}_{RB}$ is a downlink system bandwidth of the serving cell, which is expressed in multiples of PRB (physical resource block) bandwidth.

TABLE 4

| | DCI F 1 | DCI F 1A | DCI F 1B | DCI F 1C | DCI F 1D |
|---|---|---|---|---|---|
| Carrier Indicator Field (CIF) | 0 or 3 | 0 or 3 | 0 or 3 | N/A | 0 or 3 |
| Flag for format0/1A differentiation | N/A | 1 | N/A | N/A | N/A |
| Localized/Distributed Virtual Resource Block (VRB) assignment flag | N/A | 1 | 1 | N/A | 1 |
| Resource allocation header | 1 | N/A | N/A | N/A | N/A |
| Gap value | N/A | N/A | N/A | 0 ($N^{DL}_{RB} < 50$) or 1 (otherwise) | N/A |
| Resource block assignment | * | ** | ** | *** | ** |
| Modulation and coding scheme | 5 | 5 | 5 | 5 | 5 |
| HARQ process number | 3 (FDD PCell) or 4 (TDD PCell) | 3 (FDD PCell) or 4 (TDD PCell) | 3 (FDD PCell) or 4 (TDD PCell) | N/A | 3 (FDD PCell) or 4 (TDD PCell) |
| New data indicator | 1 | 1 | 1 | N/A | 1 |
| Redundancy version | 2 | 2 | 2 | N/A | 2 |
| TPC command for PUCCH | 2 | 2 | 2 | N/A | 2 |
| Downlink Assignment Index | 0 (FDD PCell) or 2 (otherwise) | 0 (FDD PCell) or 2 (otherwise) | 0 (FDD PCell) or 2 (otherwise) | N/A | 0 (FDD PCell) or 2 (otherwise) |
| SRS request | N/A | 0 or 1 | N/A | N/A | N/A |
| Downlink power offset | N/A | N/A | N/A | N/A | 1 |
| Transmitted Precoding Matrix Indicator (TPMI) information for precoding | N/A | N/A | 2 (2 CRS ports) or 4 (4 CRS ports) | N/A | 2 (2 CRS ports) or 4 (4 CRS ports) |
| HARQ-ACK resource offset | 2 (EPDCCH) or 0 (PDCCH) | 2 (EPDCCH) or 0 (PDCCH) | 2 (EPDCCH) or 0 (PDCCH) | N/A | 2 (EPDCCH) or 0 (PDCCH) |

It should be noted that * is ceil($N^{DL}_{RB}/P$) bits, where P is determined from Table 5;  is ceil($\log_2(N^{DL}_{RB}(N^{DL}_{RB}+1)/2)$) bits; and * is ceil($\log_2(\text{floor}(N^{DL}_{VRB,gap1}/N^{step}_{RB})(\text{floor}(N^{DL}_{VRB,gap1}/N^{step}_{RB})+1)/2)$) bits, where $N^{DL}_{VRB,gap1}=2*\min(N_{gap}, N^{DL}_{RB}-N_{gap})$. Ngap may be derived from system bandwidth of the concerned serving cell. $N^{step}_{RB}$ may be determined from Table 6.

TABLE 5

| System Bandwidth (BW) $N^{DL}_{RB}$ | Precoding resource block group (PRG) size P |
|---|---|
| <=10 | 1 |
| 11-26 | 2 |
| 27-63 | 3 |
| 64-110 | 4 |

TABLE 6

| System BW $N^{DL}_{RB}$ | $N^{step}_{RB}$ |
|---|---|
| 6-49 | 2 |
| 50-110 | 4 |

DCI format 2, 2A, 2B, 2C, 2D may include the bit fields provided in Table 7.

TABLE 7

| | DCI F 2 | DCI F 2A | DCI F 2B | DCI F 2C | DCI F 2D |
|---|---|---|---|---|---|
| CIF | 0 or 3 | 0 or 3 | 0 or 3 | 0 or 3 | 0 or 3 |
| Resource allocation header | 1 | 1 | 1 | 1 | 1 |
| Resource block assignment | * | * | * | * | * |
| TPC command for PUCCH | 2 | 2 | 2 | 2 | 2 |
| Downlink Assignment Index | 0 (FDD PCell) or 2 (otherwise) | 0 (FDD PCell) or 2 (otherwise) | 0 (FDD PCell) or 2 (otherwise) | 0 (FDD PCell) or 2 (otherwise) | 0 (FDD PCell) or 2 (otherwise) |
| HARQ process number | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) |
| Scrambling identity | N/A | N/A | 1 | N/A | N/A |

TABLE 7-continued

| | DCI F 2 | DCI F 2A | DCI F 2B | DCI F 2C | DCI F 2D |
|---|---|---|---|---|---|
| Antenna port, scrambling identity and number of layers | N/A | N/A | N/A | 3 | 3 |
| SRS request | N/A | N/A | 0 or 1 | 0 or 1 | N/A |
| Transport block to codeword swap flag | 1 | 1 | N/A | N/A | |
| Modulation and coding scheme (TB1) | 5 | 5 | 5 | 5 | 5 |
| New data indicator (TB1) | 1 | 1 | 1 | 1 | 1 |
| Redundancy version (TB1) | 2 | 2 | 2 | 2 | 2 |
| Modulation and coding scheme (TB2) | 5 | 5 | 5 | 5 | 5 |
| New data indicator (TB2) | 1 | 1 | 1 | 1 | 1 |
| Redundancy version (TB2) | 2 | 2 | 2 | 2 | 2 |
| PDSCH RE Mapping and Quasi-Co-Location Indicator | N/A | N/A | N/A | N/A | 2 |
| Precoding information | 3 (2 CRS ports) or 6 (4 CRS ports) | 0 (2 CRS ports) or 2 (4 CRS ports) | N/A | N/A | N/A |
| HARQ-ACK resource offset | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) |

DCI format 0 and 4 may include the following bit fields as provided in Table 8.

TABLE 8

| | DCI F 0 | DCI F 4 |
|---|---|---|
| CIF | 0 or 3 | 0 or 3 |
| Flag for format0/1A differentiation | 1 | N/A |
| Frequency hopping flag | 1 | N/A |
| Resource block assignment | **** | ***** |
| TPC command for PUSCH | 2 | 2 |
| Cyclic shift for DM-RS and orthogonal cover code (OCC) index | 3 | 3 |
| UL index | 2 (TDD conf. 0) or 0 (otherwise) | 2 (TDD conf. 0) or 0 (otherwise) |
| Downlink Assignment Index | 2 (TDD PCell) or 0 (otherwise) | 2 (TDD PCell) or 0 (otherwise) |
| CSI request | 2 (multiple DL cells, multiple CSI processes, multiple subframe sets) or 1 (otherwise) | 2 (multiple DL cells, multiple CSI processes, multiple subframe sets) or 1 (otherwise) |
| SRS request | 0 or 1 | 2 |
| Resource allocation type | 1 | 1 |
| Modulation and coding scheme (TB1) | 5 | 5 |
| New data indicator (TB1) | 1 | 1 |
| Modulation and coding scheme (TB2) | N/A | 5 |
| New data indicator (TB2) | N/A | 1 |
| Precoding information | N/A | 3 (2 CRS ports) or 6 (4 CRS ports) |

It should be noted that in Table 8, ** is $\text{ceil}(\log_2(N^{UL}_{RB}(N^{UL}_{RB}+1)/2))$ bits. Also, *** is $\max(\text{ceil}(\log_2(N^{UL}_{RB}(N^{UL}_{RB}+1)/2)), \text{ceil}(\log_2(C(\text{ceil}(N^{UL}_{RB}/P+1), 4))))$ bits, where $C(n, r)$ is a formula for Combinations (i.e., "n choose r").

A PDCCH/EPDCCH search space is also described herein. PDCCH may be transmitted using the first 1 to 4 OFDM symbols in a subframe, while PDCCH may be transmitted using the OFDM symbols starting with the second to the fifth OFDM symbol and ending with the last OFDM symbol in a subframe. Resource element groups (REG) may be used for defining the mapping of control channels to resource elements.

A resource-element group may be represented by the index pair $(k',l')$ of the resource element with the lowest index k in the group with all resource elements in the group having the same value of l. For example, $(k,l=0)$ with $k=k_0+0, k_0+1, \ldots, k_0+5$ or $k=k_0+6, k_0+7, \ldots, k_0+11$. The set of resource elements $(k,l)$ in a resource-element group depends on the number of cell-specific reference signals configured. Four symbols can be mapped to a single resource-element group. Mapping of a symbol-quadruplet $\langle z(i), z(i+1), z(i+2), z(i+3) \rangle$ onto a resource-element group represented by resource-element $(k',l')$ is defined such that elements $z(i)$ are mapped to resource elements $(k,l)$ of the resource-element group not used for cell-specific reference signals in increasing order of i and k.

The physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. The PDCCH supports multiple formats. A PDCCH consisting of n consecutive CCEs may only start on a CCE fulfilling i mod n=0, where i is the CCE number.

Enhanced resource element groups (EREG) are used for defining the mapping of enhanced control channels to resource elements. There are 16 EREGs, numbered from 0 to 15, per physical resource block pair. All resource elements, except resource elements carrying DM-RS for antenna ports p={107,108,109,110} for normal cyclic prefix or p={107,108} for extended cyclic prefix, may be numbered in a physical resource-block pair cyclically from 0 to 15 in an increasing order of first frequency, then time. All resource elements with number i in that physical resource-block pair constitutes EREG number i.

The enhanced physical downlink control channel (EPDCCH) carries scheduling assignments. An EPDCCH may be transmitted using an aggregation of one or several consecutive enhanced control channel elements (ECCEs) where each ECCE consists of multiple enhanced resource element groups (EREGs). The number of ECCEs used for one EPDCCH depends on the EPDCCH format.

Both localized and distributed transmission may be supported. An EPDCCH can use either localized or distributed transmission, differing in the mapping of ECCEs to EREGs and PRB pairs.

The control region of each serving cell consists of a set of CCEs, numbered from 0 to $N_{CCE,k}-1$, where $N_{CCE,k}$ is the total number of CCEs in the control region of subframe k. The UE 102 may monitor a set of PDCCH candidates on one or more activated serving cells as configured by higher layer signaling for control information, where monitoring implies attempting to decode each of the PDCCHs in the set according to all the monitored DCI formats.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\bmod \lfloor N_{CCE,k}/L \rfloor\}+i. \qquad (1)$$

In Equation (1), $Y_k$ is defined below, and i=0, ..., L−1. For the common search space (CSS) m'=m. For the PDCCH UE specific search space, for the serving cell on which PDCCH is monitored, if the monitoring UE 102 is configured with a carrier indicator field, then m'=m+$M^{(L)} \cdot n_{CI}$ where $n_{CI}$ is the carrier indicator field value. Otherwise, if the monitoring UE 102 is not configured with a carrier indicator field then m'=m, where m=0, ..., $M^{(L)}$−1. $M^{(L)}$ is the number of PDCCH candidates to monitor in the given search space.

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k=(A \cdot Y_{k-1}) \bmod D. \qquad (2)$$

In Equation (2), $Y_{k-1}=n_{RNTI} \neq 0$, A=39827, D=65537 and k=$\lfloor n_s/2 \rfloor$, where $n_s$ is the slot number within a radio frame. The RNTI value used for $n_{RNTI}$ may be any RNTI.

The UE 102 may monitor one common search space in every non-discontinuous reception (DRX) subframe at each of the aggregation levels 4 and 8 on the primary cell. If a UE 102 is not configured for EPDCCH monitoring, and if the UE 102 is not configured with a carrier indicator field, then the UE 102 may monitor one PDCCH UE-specific search space at each of the aggregation levels 1, 2, 4, 8 on each activated serving cell in every non-DRX subframe.

If a UE 102 is not configured for EPDCCH monitoring, and if the UE 102 is configured with a carrier indicator field, then the UE 102 may monitor one or more UE-specific search spaces at each of the aggregation levels 1, 2, 4, 8 on one or more activated serving cells as configured by higher layer signaling in every non-DRX subframe.

If a UE 102 is configured for EPDCCH monitoring on a serving cell, and if that serving cell is activated, and if the UE 102 is not configured with a carrier indicator field, then the UE 102 may monitor one PDCCH UE-specific search space at each of the aggregation levels 1, 2, 4, 8 on that serving cell in all non-DRX subframes where EPDCCH is not monitored on that serving cell.

If a UE 102 is configured for EPDCCH monitoring on a serving cell, and if that serving cell is activated, and if the UE 102 is configured with a carrier indicator field, then the UE 102 may monitor one or more PDCCH UE-specific search spaces at each of the aggregation levels 1, 2, 4, 8 on that serving cell as configured by higher layer signaling in all non-DRX subframes where EPDCCH is not monitored on that serving cell.

The common and PDCCH UE-specific search spaces on the primary cell may overlap.

A UE configured with the carrier indicator field associated with monitoring PDCCH on serving cell c may monitor PDCCH configured with carrier indicator field and with cyclic redundancy check (CRC) scrambled by the Cell Radio Network Temporary Identifier (C-RNTI) in the PDCCH UE specific search space of serving cell c.

A UE 102 configured with the carrier indicator field associated with monitoring PDCCH on the primary cell may monitor PDCCH configured with carrier indicator field and with CRC scrambled by Semi-Persistent Scheduling (SPS) C-RNTI in the PDCCH UE specific search space of the primary cell.

The UE may monitor the common search space for PDCCH without carrier indicator field. For the serving cell on which PDCCH is monitored, if the UE 102 is not configured with a carrier indicator field, it shall monitor the PDCCH UE specific search space for PDCCH without carrier indicator field, if the UE 102 is configured with a carrier indicator field it shall monitor the PDCCH UE specific search space for PDCCH with carrier indicator field.

If the UE 102 is not configured with a LAA SCell, the UE 102 is not expected to monitor the PDCCH of a secondary cell if it is configured to monitor PDCCH with carrier indicator field corresponding to that secondary cell in another serving cell.

If the UE 102 is configured with a LAA SCell, the UE 102 is not expected to monitor the PDCCH UE specific space of the LAA SCell if it is configured to monitor PDCCH with a carrier indicator field corresponding to that LAA SCell in another serving cell where the UE 102 is not expected to be configured to monitor PDCCH with carrier indicator field in an LAA SCell. Alternatively, the UE 102 is not expected to monitor the PDCCH UE specific space of the LAA SCell if it is configured to monitor PDCCH with a carrier indicator field corresponding to that LAA SCell in another serving cell where the UE 102 is not expected to be scheduled with PDSCH starting in the second slot in a subframe in an LAA SCell if the UE 102 is configured to monitor PDCCH with carrier indicator field corresponding to that LAA SCell in another serving cell.

For the serving cell on which PDCCH is monitored, the UE 102 may monitor PDCCH candidates at least for the same serving cell. A UE 102 configured to monitor PDCCH candidates with CRC scrambled by C-RNTI or SPS C-RNTI with a common payload size and with the same first CCE index $n_{CCE}$ but with different sets of DCI information fields in the common search space or PDCCH UE specific search space on the primary cell may assume that for the PDCCH candidates with CRC scrambled by C-RNTI or SPS C-RNTI, if the UE 102 is configured with the carrier indicator field associated with monitoring the PDCCH on the primary cell, only the PDCCH in the common search space is transmitted by the primary cell. Otherwise, only the PDCCH in the UE specific search space is transmitted by the primary cell.

A UE 102 configured to monitor PDCCH candidates in a given serving cell with a given DCI format size with CIF, and CRC scrambled by C-RNTI, where the PDCCH candidates may have one or more possible values of CIF for the given DCI format size, may assume that a PDCCH candidate with the given DCI format size may be transmitted in the given serving cell in any PDCCH UE specific search space corresponding to any of the possible values of CIF for the given DCI format size.

If a serving cell is a LAA SCell, and if the higher layer parameter subframeStartPosition for the SCell indicates 's07', the UE 102 monitors PDCCH UE-specific search space candidates on the SCell in both the first and second slots of a subframe. Otherwise, the UE 102 monitors PDCCH UE-specific search space candidates on the SCell in the first slots of a subframe.

If a serving cell is a LAA SCell, the UE 102 may receive PDCCH with DCI CRC scrambled by a component carrier Radio Network Temporary Identifier (CC-RNTI) on the LAA SCell. The DCI formats that the UE 102 may monitor depend on the configured transmission mode per each serving cell. If a UE 102 is configured with higher layer parameter skipMonitoringDCI-format0-1A for a serving cell, the UE 102 is not required to monitor the PDCCH with DCI Format 0/1A in the UE specific search space for that serving cell.

Regarding the EPDCCH search space, for each serving cell, higher layer signaling can configure a UE 102 with one or two EPDCCH-PRB-sets for EPDCCH monitoring. The PRB-pairs corresponding to an EPDCCH-PRB-set are indicated by higher layers. Each EPDCCH-PRB-set may consist of a set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE 102 may monitor a set of EPDCCH candidates on one or more activated serving cells as configured by higher layer signaling for control information, where monitoring implies attempting to decode each of the EPDCCHs in the set according to the monitored DCI formats.

The UE 102 may monitor a set of EPDCCH candidates on one or more activated serving cells as configured by higher layer signaling for control information. Monitoring may imply attempting to decode each of the EPDCCHs in the set according to the monitored DCI formats.

The set of EPDCCH candidates to monitor are defined in terms of EPDCCH UE-specific search spaces. For each serving cell, the subframes in which the UE 102 monitors EPDCCH UE-specific search spaces are configured by higher layers.

The UE 102 may not monitor EPDCCH for TDD and normal downlink CP, in special subframes for the special subframe configurations 0 and 5. The UE 102 may not monitor EPDCCH for TDD and extended downlink CP, in special subframes for the special subframe configurations 0, 4 and 7. The UE 102 may not monitor EPDCCH in subframes indicated by higher layers to decode PMCH. The UE 102 may not monitor EPDCCH for TDD and if the UE 102 is configured with different UL/DL configurations for the primary and a secondary cell, in a downlink subframe on the secondary cell when the same subframe on the primary cell is a special subframe and the UE 102 is not capable of simultaneous reception and transmission on the primary and secondary cells.

An EPDCCH UE-specific search space $ES_k^{(L)}$ at aggregation level $L \in \{1,2,4,8,16,32\}$ is defined by a set of EPDCCH candidates. For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor \right\} + i. \qquad (3)$$

In Equation (3), $Y_{p,k}$ is defined below, i=0, . . . , L−1, and $b=n_{CI}$ if the UE 102 is configured with a carrier indicator field for the serving cell on which EPDCCH is monitored, otherwise b=0. Also in Equation (3), $n_{CI}$ is the carrier indicator field value and m=0, 1 . . . $M_p^{(L)}-1$.

If the UE 102 is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored. Otherwise, $M_p^{(L)}$ is the number of EPDCCH candidates to monitor at aggregation level L in EPDCCH-PRB-set p for the serving cell indicated by $n_{CI}$.

The variable $Y_{p,k}$ is defined by $$Y_{p,k}=(A_p \cdot Y_{p,k-1}) \mod D. \qquad (4)$$

In Equation (4), $Y_{p,k-1}=n_{RNTI} \neq 0$, $A_0=39827$, $A_1=39829$, D=65537 and $k=\lfloor n_s/2 \rfloor$, where $n_s$ is the slot number within a radio frame.

If a UE 102 is configured with higher layer parameter skipMonitoringDCI-format0-1A for a serving cell, the UE 102 is not required to monitor the EPDCCH with DCI Format 0/1A in the UE specific search space for that serving cell.

If the UE 102 is not configured with a carrier indicator field, then the UE 102 may monitor one EPDCCH UE-specific search space at each of the aggregation levels on each activated serving cell for which it is configured to monitor EPDCCH.

If a UE 102 is configured for EPDCCH monitoring, and if the UE 102 is configured with a carrier indicator field, then the UE 102 may monitor one or more EPDCCH UE-specific search spaces at each of the aggregation levels on one or more activated serving cells as configured by higher layer signaling.

A UE 102 configured with the carrier indicator field associated with monitoring EPDCCH on serving cell c may monitor EPDCCH configured with the carrier indicator field and with CRC scrambled by C-RNTI in the EPDCCH UE specific search space of serving cell c.

A UE 102 configured with the carrier indicator field associated with monitoring EPDCCH on the primary cell may monitor EPDCCH configured with the carrier indicator field and with CRC scrambled by SPS C-RNTI in the EPDCCH UE specific search space of the primary cell.

A UE 102 is not expected to be configured to monitor EPDCCH with a carrier indicator field in an LAA SCell. A UE is not expected to be scheduled with PDSCH starting in the second slot in a subframe in an LAA SCell if the UE 102 is configured to monitor EPDCCH with a carrier indicator field corresponding to that LAA SCell in another serving cell.

For the serving cell on which EPDCCH is monitored, if the UE 102 is not configured with a carrier indicator field, it may monitor the EPDCCH UE specific search space for EPDCCH without the carrier indicator field. If the UE 102 is configured with a carrier indicator field it may monitor the EPDCCH UE specific search space for EPDCCH with the carrier indicator field.

A UE 102 is not expected to monitor the EPDCCH of a secondary cell if it is configured to monitor EPDCCH with a carrier indicator field corresponding to that secondary cell in another serving cell. For the serving cell on which EPDCCH is monitored, the UE 102 may monitor EPDCCH candidates at least for the same serving cell.

A UE 102 configured to monitor EPDCCH candidates in a given serving cell with a given DCI format size with CIF, and CRC scrambled by C-RNTI, where the EPDCCH candidates may have one or more possible values of CIF for the given DCI format size, may assume that an EPDCCH candidate with the given DCI format size may be transmitted in the given serving cell in any EPDCCH UE specific search space corresponding to any of the possible values of CIF for the given DCI format size.

For the serving cell on which EPDCCH is monitored, a UE 102 is not required to monitor the EPDCCH in a subframe that is configured by higher layers to be part of a positioning reference signal occasion if the positioning reference signal occasion is only configured within Multimedia Broadcast Single Frequency Network (MBSFN) subframes and the cyclic prefix length used in subframe #0 is a normal cyclic prefix.

The UE's 102 MAC procedure may include the following operations. Downlink Shared Channel (DL-SCH) data transfer may include DL assignment reception and HARQ operation. For the DL assignment reception, downlink assignments transmitted on the PDCCH indicate if there is a transmission on a DL-SCH for a particular MAC entity and provide the relevant HARQ information.

For the HARQ operation, there may be one HARQ entity at the MAC entity for each serving cell that maintains a number of parallel HARQ processes. Each HARQ process may be associated with a HARQ process identifier. The HARQ entity may direct HARQ information and associated transport blocks (TBs) received on the DL-SCH to the corresponding HARQ processes. If a downlink assignment has been indicated for this transmission time interval (TTI), the MAC entity may allocate the TB(s) received from the physical layer and the associated HARQ information to the HARQ process indicated by the associated HARQ information. If this is a new transmission, the MAC entity may then attempt to decode the received data. If this is a retransmission, the MAC entity may then combine the received data with the data currently in the soft buffer for this TB and attempts to decode the combined data.

The UE's 102 MAC procedure may also include UL-SCH data transfer. This may include a UL grant reception; HARQ operation; and multiplexing and assembly. For UL grant reception, in order to transmit on the UL-SCH the MAC entity must have a valid uplink grant (except for non-adaptive HARQ retransmissions) which it may receive dynamically on the PDCCH or in a random access response or which may be configured semi-persistently. To perform requested transmissions, the MAC layer may receive HARQ information from lower layers. When the physical layer is configured for uplink spatial multiplexing, the MAC layer may receive up to two grants (one per HARQ process) for the same TTI from lower layers.

For HARQ operation, there may be one HARQ entity at the MAC entity for each serving cell with a configured uplink, which maintains a number of parallel HARQ processes allowing transmissions to take place continuously while waiting for the HARQ feedback on the successful or unsuccessful reception of previous transmissions. At a given TTI, if an uplink grant is indicated for the TTI, the HARQ entity may identify the HARQ process(es) for which a transmission should take place. It may also route the received HARQ feedback (i.e., acknowledgment (ACK) or negative acknowledgment (NACK) information), modulation and coding scheme (MCS) and resource, relayed by the physical layer, to the appropriate HARQ process(es). For each TTI, the HARQ entity may identify the HARQ process(es) associated with this TTI.

For multiplexing and assembly, RRC may control the scheduling of uplink data by signaling for each logical channel. An increasing priority value may indicate a lower priority level, prioritisedBitRate may set the prioritized bit rate (PBR), bucketSizeDuration may set the bucket size duration (BSD).

The MAC entity may maintain a variable Bj for each logical channel j. Bj may be initialized to zero when the related logical channel is established, and may be incremented by the product PBR×TTI duration for each TTI, where PBR is the prioritized bit rate of logical channel j. However, the value of Bj may never exceed the bucket size and if the value of Bj is larger than the bucket size of logical channel j, Bj may be set to the bucket size. The bucket size of a logical channel is equal to PBR×BSD, where PBR and BSD are configured by upper layers.

When a Scheduling Request (SR) is triggered, it may be considered as pending until it is cancelled. All pending SR(s) may be cancelled and sr-ProhibitTimer may be stopped when a MAC Protocol Data Unit (PDU) is assembled and this PDU includes a Buffer Status Report (BSR) that contains a buffer status up to (and including) the last event that triggered a BSR or, if all pending SR(s) are triggered by a sidelink BSR, when a MAC PDU is assembled and this PDU includes a sidelink BSR which contains buffer status up to (and including) the last event that triggered a sidelink BSR, or, if all pending SR(s) are triggered by a sidelink BSR, when upper layers configure autonomous resource selection, or when the UL grant(s) can accommodate all pending data available for transmission.

A buffer status reporting procedure may be used to provide the serving eNB 160 with information about the amount of data available for transmission in the UL buffers associated with the MAC entity. RRC controls BSR reporting by configuring three timers (e.g., periodicBSR-Timer, retxBSR-Timer and logicalChannelSR-ProhibitTimer) and by, for each logical channel, optionally signaling logicalChannelGroup, which allocates the logical channel to a logical channel group (LCG).

A power headroom reporting procedure may be used to provide the serving eNB 160 with information about the difference between the nominal UE maximum transmit power and the estimated power for UL-SCH transmission per activated serving cell and also with information about the difference between the nominal UE maximum power and the estimated power for UL-SCH and PUCCH transmission on a SpCell.

A solution to reduce latency is shortened round trip time (RTT) for legacy (1 ms) TTI. This covers the cases of carrier aggregation and non-carrier aggregation. For the shortened RTT, an interval between TB reception and HARQ-ACK transmission may be shorter than that of the normal RTT.

Alternatively, an interval between HARQ-ACK reception and TB retransmission may be shorter than that of the normal RTT. Or, both of them may be shorter. These may require faster processing.

Shortened RTT with 1 ms TTI may apply at least for the case of restricted maximum supported transport block sizes for PDSCH and/or PUSCH when the reduced minimum timing is in operation. Reducing processing time can significantly reduce the user plane latency and improve Transmission Control Protocol (TCP) throughput. Moreover, reducing processing time is useful for delay-sensitive real-time applications.

A retransmission cycle of a DL-TB with a shortened RTT timeline is described in connection with FIG. 10. A retransmission cycle of a UL-TB with the shortened RTT timeline is described in connection with FIG. 11.

The shortened RTT may be applied independently of shortened TTI, and they can be applied simultaneously. The dedicated RRC message indicating a configuration of shortened RTT may also include the shortened RTT value or an equivalent such as the value k. The shortened RTT may also be referred to as sRTT, short processing time, short scheduling delay, reduced processing time, processing time reduction, quick HARQ-ACK reporting, or the like.

A UE 102 configured with the shortened RTT may still perform the normal RTT-based communication. It should be noted that shortened RTT-based communication may support PDCCH only so that the UE 102 finishes DCI decoding earlier. Alternatively, shortened RTT-based communication may support PDCCH and EPDCCH so that the eNB 160 has more scheduling flexibility.

Fallback to normal RTT is also described herein. Even when a UE 102 is configured with shortened RTT-based communication in a serving cell (e.g., PCell, PSCell), the UE 102 may also still be able to perform the normal RTT-based communication in the same serving cell. In other words, shortened RTT-based HARQ processes and normal RTT-based HARQ processes may be able to operate simultaneously between the eNB 160 and the UE 102 in the serving cell.

For DL transmissions, there are at least two alternatives from the PDSCH transmission/reception perspective. In a first alternative (A1), an eNB 160 may transmit shortened RTT-based (E)PDCCH/PDSCH and normal RTT-based (E)PDCCH/PDSCH for a single UE 102 in a single subframe. The UE 102 can receive shortened RTT-based (E)PDCCH/PDSCH and normal RTT-based (E)PDCCH/PDSCH in the single subframe.

In a second alternative (A2), an eNB 160 may transmit shortened RTT-based (E)PDCCH/PDSCH and normal RTT-based (E)PDCCH/PDSCH for a single UE 102 in different subframes but not in a single subframe. The UE 102 can receive shortened RTT-based (E)PDCCH/PDSCH and normal RTT-based (E)PDCCH/PDSCH in the different subframes but cannot receive (or "is not expected to receive") them in a single subframe.

For DL transmissions, there are two alternatives from the PDSCH associated HARQ-ACK transmission/reception perspective. In a first alternative (B1), a UE 102 may transmit HARQ-ACKs of shortened RTT-based PDSCH and normal RTT-based PDSCH in a single subframe. The eNB 160 can receive HARQ-ACKs of shortened RTT-based PDSCH and normal RTT-based PDSCH from the UE 102 in the single subframe.

In a second alternative (B2), a UE 102 may transmit HARQ-ACKs of shortened RTT-based PDSCH and normal RTT-based PDSCH in different subframes but not in a single subframe. The eNB 160 can receive HARQ-ACKs of shortened RTT-based PDSCH and normal RTT-based PDSCH from the UE 102 in the different subframes but is not expected to receive them in a single subframe.

Similarly, for UL transmissions, there are two alternatives from the (E)PDCCH/PHICH transmission/reception perspective. In a first alternative (C1), an eNB 160 may transmit shortened RTT-based (E)PDCCH/PHICH and normal RTT-based (E)PDCCH/PHICH for a single UE 102 in a single subframe. The UE 102 can receive shortened RTT-based (E)PDCCH/PHICH and normal RTT-based (E)PDCCH/PHICH in the single subframe.

In a second alternative (C2), an eNB 160 may transmit shortened RTT-based (E)PDCCH/PHICH and normal RTT-based (E)PDCCH/PHICH for a single UE 102 in different subframes but not in a single subframe. The UE 102 can receive shortened RTT-based (E)PDCCH/PHICH and normal RTT-based (E)PDCCH/PHICH in the different subframes but cannot receive (or "is not expected to receive") them in a single subframe.

For UL transmissions, there are two alternatives from the PUSCH transmission/reception perspective. In a first alternative (D1), a UE 102 may transmit shortened RTT-based PUSCH and normal RTT-based PUSCH in a single subframe. The eNB 160 can receive shortened RTT-based PUSCH and normal RTT-based PUSCH from the UE 102 in the single subframe.

In a second alternative (D2), a UE 102 may transmit shortened RTT-based PUSCH and normal RTT-based PUSCH in different subframes but not in a single subframe. The eNB 160 can receive shortened RTT-based PUSCH and normal RTT-based PUSCH from the UE 102 in the different subframes but is not expected to receive them in a single subframe.

Any combination of the alternatives A, B, C, and D is possible, and each of them has its merit. Among them, typical combinations could be [A1, B1, C1, D1], [A1, B2, C1, D1], [A2, B1, C2, D1], [A2, B2, C2, D1], and [A2, B2, C2, D2].

On alternative A1 and A2, the UE 102 may have to have a knowledge about which RTT-based PDSCH is scheduled in the subframe where (E)PDCCH is detected. There are several approaches for realizing this.

In a first approach (Approach 1), search space types are different between shortened RTT and normal RTT. More specifically, when the eNB 160 transmits normal RTT-based PDSCH, the eNB 160 may transmit the corresponding PDCCH (e.g., PDCCH carrying DL assignment which schedules the PDSCH) on a PDCCH CSS. When the eNB 160 transmits shortened RTT-based PDSCH, the eNB 160 may transmit the corresponding (E)PDCCH on an (E)PDCCH UE-specific search space (USS).

If the UE 102 detects PDCCH on the PDCCH CSS, the UE 102 may assume that the corresponding PDSCH is a normal RTT-based PDSCH. If the UE 102 detects (E)PDCCH on the (E)PDCCH USS, the UE 102 may assume that the corresponding PDSCH is a shortened RTT-based PDSCH. With this approach, the normal RTT-based PDSCH may be scheduled only by DCI format 1A, while the shortened RTT-based PDSCH may be scheduled by the other DCI formats (e.g., DCI format 2, 2A, 2C, 2D, etc.) as well as DCI format 1A.

In a second approach (Approach 2), the search spaces are different between shortened RTT and normal RTT. For example, given that there are $M^{(L)}$ (E)PDCCH candidates for aggregation level L, the first $M_1^{(L)}$ (E)PDCCH candidates may carry DL assignment for the normal RTT-based PDSCH, and the remaining $M_2^{(L)}$(E)PDCCH candidates may carry DL assignment for the shortened RTT-based PDSCH. Here, $M_1^{(L)}+M_2^{(L)}=M^{(L)}$.

For another example, $M^{(L)}$ (E)PDCCH candidates with aggregation level L less than or equal to $L_t$ may carry DL assignment for the normal RTT-based PDSCH, while $M^{(L)}$ (E)PDCCH candidates with aggregation level L greater than $L_t$ may carry DL assignment for the shortened RTT-based PDSCH. For EPDCCH, this search space separation may be done per EPDCCH PRB set.

In a third approach (Approach 3), EPDCCH PRB sets are different between shortened RTT and normal RTT. More specifically, an information element of EPDCCH PRB sets configuration may also be able to include information which indicates that EPDCCHs within the concerned EPDCCH PRB set schedules the shortened RTT-based PDSCH. If the information element does not include this information, EPDCCHs within the concerned EPDCCH PRB set schedules the normal RTT-based PDSCH. If EPDCCH PRB sets, one of which is for the normal RTT base and the other is for the shortened RTT, are overlapped, and if DCI format sizes are the same between those two EPDCCH PRB sets, the UE 102 and the eNB 160 assume the detected EPDCCH may schedule the normal RTT-based PDSCH in order to avoid ambiguity on the RTT type. Alternatively, the detected EPDCCH may schedule the shortened RTT-based PDSCH.

In a fourth approach (Approach 4), DCI formats are different between shortened RTT and normal RTT. For example, DCI format sizes are different. For shortened RTT, DCI format for very compact scheduling (e.g., DCI format 1A or 1C or a new DCI format having the same or even smaller size with DCI format 1A or 1C may be used), while the normal DCI format may be used for the normal RTT. To reduce the DCI format size, the new DCI format for the shortened RTT might not have some information field(s) (e.g., Resource block assignment field). Instead, the new DCI format may include an information field indicating for one of several parameter sets that are configured by higher layer signaling such as dedicated RRC signaling. Each of the parameter sets may include Resource block assignment, etc.

In a fifth approach (Approach 5), HARQ processes are different between shortened RTT and normal RTT. In one example, the shortened RTT may be configured per HARQ process. More specifically, there are 8 HARQ processes for FDD. The eNB 160 may send the UE 102 a dedicated RRC message indicating the HARQ process numbers for which the shortened RTT applies. The UE configured with the shortened RTT according to the RRC message assumes the shortened RTT for the HARQ process(es) whose HARQ process numbers are indicated. The UE 102 may assume the normal RTT for the other HARQ process(es). Alternatively, the dedicated RRC message may indicate 8-bits-long bitmap information, where the i-th bit corresponds to the i-th HARQ process and indicates whether the shortened RTT applies to the i-th HARQ process or not. In another example, once the UE 102 is configured with shortened RTT, the shortened RTT applies to pre-determined HARQ process(es). Any combination of the above approaches may be applied.

Similarly to alternative A1 and A2, also for alternative C1 and C2, the UE 102 may have to have knowledge about which RTT-based PUSCH is scheduled in the subframe where (E)PDCCH is detected. The above-described approaches may be applicable. In this case, PDSCH is replaced by PUSCH; and with the timing difference between PDSCH and the corresponding HARQ-ACK replaced by the timing difference between (E)PDCCH and the corresponding PUSCH and/or the timing difference between PUSCH and the corresponding PHICH.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB reduced latency module 194.

The eNB reduced latency module 194 may reduce latency through the use of a shortened round trip time (RTT). In an implementation, the eNB reduced latency module 194 may configure, in a UE 102, a short processing time for a serving cell. The eNB reduced latency module 194 may transmit, in a subframe n, a PDCCH. The eNB reduced latency module 194 may transmit, in the subframe n, a PDSCH corresponding to the PDCCH. The eNB reduced latency module 194 may obtain, in a subframe n+k, a HARQ-ACK corresponding to the PDSCH. In a case that the PDCCH is a PDCCH in common search space, the k may be equal to $k_1$. In a case that the PDCCH is a PDCCH in UE-specific search space, the k may be equal to $k_2$. The $k_2$ may be smaller than the $k_1$.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2A:
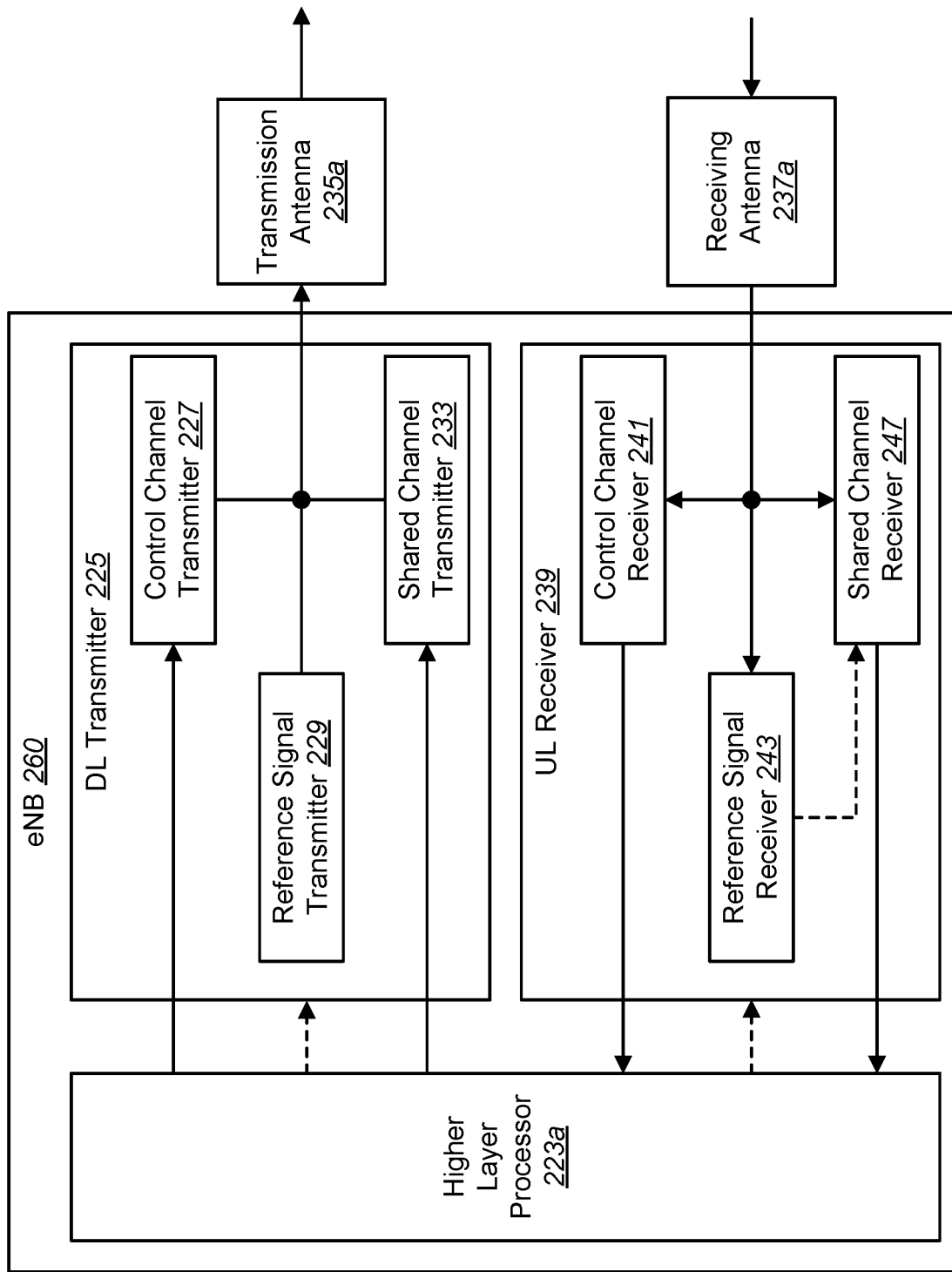
FIGS. 2A and 2B are block diagrams illustrating a detailed configuration of an eNB and a UE in which systems and methods for low latency radio communications may be implemented.
Figure 2B:
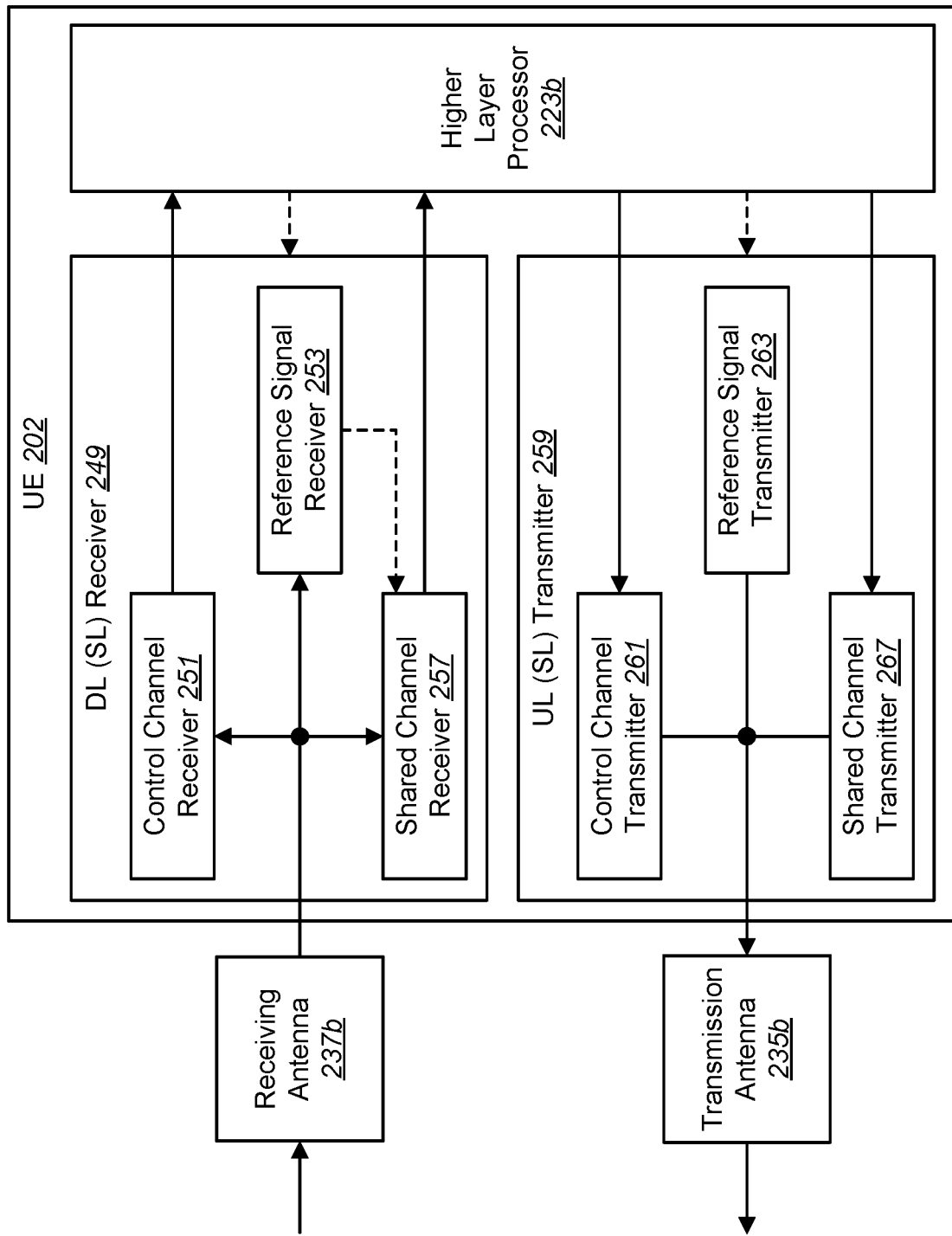

FIGS. 2A and 2B are block diagrams illustrating a detailed configuration of an eNB 260 and a UE 202 in which systems and methods for low latency radio communications may be implemented. In FIG. 2A, the eNB 260 may include a higher layer processor 223a, a DL transmitter 225 (also referred to as a physical layer transmitter) and a UL receiver 239 (also referred to as a physical layer receiver). The higher layer processor 223a may communicate with the DL transmitter 225, UL receiver 239 and subsystems of each.

The DL transmitter 225 may include a control channel transmitter 227 (also referred to as a physical downlink control channel transmitter), a shared channel transmitter 233 (also referred to as a physical downlink shared channel transmitter), and a reference signal transmitter 229 (also referred to as a physical signal transmitter). The DL transmitter 225 may transmit signals/channels to a UE 202 using a transmission antenna 235a.

The UL receiver 239 may include a control channel receiver 241 (also referred to as a physical uplink control channel receiver), a shared channel receiver 247 (also referred to as a physical uplink shared channel receiver), and a reference signal receiver 243 (also referred to as a physical signal receiver). The UL receiver 239 may receive signals/channels from the UE 202 using a receiving antenna 237a.

The eNB 260 may configure, in a UE 202, shortened RTT for a serving cell. The configuration may be performed by the higher layer processor 223a. The higher layer processor 223a may also control the DL transmitter 225 and UL receiver 239 based on the configuration. To be more specific, the higher layer processor 223a may control transmission and reception timing of the physical layer transmitter and receiver.

Upon the configuration, the eNB 260 may use the normal RTT and the shortened RTT for communication with the UE 202. More specifically, a HARQ process for the normal RTT-based transmission and a HARQ process for the shortened RTT-based transmission may run simultaneously on the serving cell for DL and/or UL.

In FIG. 2B, the UE 202 may include a higher layer processor 223b, a DL (SL) receiver 249 (also referred to as a physical layer receiver) and a UL (SL) transmitter 259 (also referred to as a physical layer transmitter). The higher layer processor 223b may communicate with the DL (SL) receiver 249, UL (SL) transmitter 259 and subsystems of each.

The DL (SL) receiver 249 may include a control channel receiver 251 (also referred to as a physical downlink control channel receiver), a shared channel receiver 257 (also referred to as a physical downlink shared channel receiver), and a reference signal receiver 253 (also referred to as a physical signal transmitter). The DL (SL) receiver 249 may receive signals/channels from the eNB 260 using a receiving antenna 237b.

The UL (SL) transmitter 259 may include control channel transmitter 261 (also referred to as a physical uplink control channel transmitter), a shared channel transmitter 267 (also referred to as a physical uplink shared channel transmitter), and a reference signal transmitter 263 (also referred to as a physical signal receiver). The UL (SL) transmitter 259 may send signals/channels to the eNB 260 using a transmission antenna 235b.

The UE 202 may configure (e.g., acquire a configuration of) shortened RTT for a serving cell. The configuration may be performed by the higher layer processor 223b. The higher layer processor 223b may also control the physical layer transmitter and receiver based on the configuration. To more specific, the higher layer processor 223b may control transmission and reception timing of the physical layer transmitter and receiver.

Upon the configuration, the UE 202 may use the normal RTT and the shortened RTT for communication with the UE 202. More specifically, a HARQ process for the normal RTT-based transmission and a HARQ process for the shortened RTT-based transmission may run simultaneously on the serving cell for DL and/or UL.

In an example, the eNB 260 and the UE 202 may have the following structures to support the approach 1 for DL HARQ RTT reduction. The eNB 260 may comprise a higher-layer processor 223a that configures, for the UE 202, a short processing time for DL HARQ. The UE 202 may comprise a higher-layer processor 223b that configures the short processing time.

The eNB 260 may also comprise the PDCCH transmitter (e.g., control channel transmitter 227) that transmits, in a subframe n, a PDCCH. The UE 202 may also comprise the PDCCH receiver (e.g., control channel receiver 251) that receives (monitors), in the subframe n, the PDCCH.

The eNB 260 may also comprise the PDSCH transmitter (e.g., shared channel transmitter 233) configured to transmit, in the subframe n, the PDSCH corresponding to the PDCCH. The UE 202 may also comprise the PDSCH receiver (e.g., shared channel receiver 257) that receives, in the subframe n, the corresponding PDSCH upon the detection of the PDCCH.

The UE 202 may comprise the uplink transmitter 259 that feeds back, in the subframe n+k, a HARQ-ACK indicating the result of the PDSCH decoding (ACK for successful decoding; NACK for unsuccessful decoding). The eNB 260 may comprise the uplink receiver 239 that obtains, in the subframe n+k, the HARQ-ACK.

In a case that the PDCCH is a PDCCH in common search space, the k is equal to $k_1$. In a case that the PDCCH is a PDCCH in UE-specific search space, the k is equal to $k_2$, where the $k_2$ is smaller than the $k_1$. Moreover, if the UE 202 is not configured with the short processing time, and if the HARQ-ACK in the subframe n+k corresponds to the PDSCH in the subframe n, the k is equal to $k_1$.

From another perspective, the eNB 260 may comprise a higher-layer processor 223a that configures, for the UE 202, a short processing time. The UE 202 may comprise a higher-layer processor 223b that configures the short processing time. The eNB 260 may also comprise the PDCCH transmitter that transmits a PDCCH. The UE 202 may also comprise the PDCCH receiver that receives (monitors) the PDCCH. The eNB 260 may also comprise the PDSCH transmitter configured to transmit, in the same subframe, the PDSCH corresponding to the PDCCH. The UE 202 may also comprise the PDSCH receiver that receives, in the same subframe, the corresponding PDSCH upon the detection of the PDCCH. The UE 202 may comprise the uplink transmitter 259 that feeds back, in the subframe n, a HARQ-ACK indicating the result of the PDSCH decoding (ACK for successful decoding; NACK for unsuccessful decoding). The eNB 260 may comprise the uplink receiver 239 that obtains, in the subframe n, the HARQ-ACK.

In a case that the PDCCH is a PDCCH in common search space, the HARQ-ACK in the subframe n corresponds to the PDSCH in subframe n−$k_1$. In a case that the PDCCH is a PDCCH in UE-specific search space, the HARQ-ACK in the subframe n corresponds to the PDSCH in subframe n−$k_2$, where the $k_2$ is smaller than the $k_1$. Moreover, if the UE 202 is not configured with the short processing time, and if the HARQ-ACK in the subframe n corresponds to the PDSCH in the subframe n−k, the k is equal to $k_1$.

In another example, the eNB 260 and the UE 202 may have the following structures to support the approach 1 for UL HARQ RTT reduction. The eNB 260 may comprise a higher-layer processor 223a that configures, for the UE 202, a short processing time for UL HARQ. The UE 202 may comprise a higher-layer processor 223b that configures the short processing time. The eNB 260 may also comprise the PDCCH transmitter that transmits, in a subframe n, a PDCCH. The UE 202 may also comprise the PDCCH receiver that receives (monitors), in the subframe n, the PDCCH. The UE 202 may also comprise the PUSCH transmitter that transmits, in the subframe n+k, the PUSCH corresponding to the PDCCH upon the detection of the PDCCH. The eNB 260 may also comprise the PUSCH receiver configured to receive, in the subframe n+k, the PDSCH corresponding to the PDCCH.

In a case that the PDCCH is a PDCCH in common search space, the k is equal to $k_1$. In a case that the PDCCH is a PDCCH in UE-specific search space, the k is equal to $k_2$, where the $k_2$ is smaller than the $k_1$. Moreover, if the UE 202 is not configured with the short processing time, and if the PUSCH in the subframe n+k corresponds to the PDCCH in the subframe n, the k is equal to $k_1$.

From another perspective, the eNB 260 may comprise a higher-layer processor 223a that configures, for the UE 202, a short processing time for UL HARQ. The UE 202 may comprise a higher-layer processor 223b that configures the short processing time. The eNB 260 may also comprise the PDCCH transmitter that transmits a PDCCH. The UE 202 may also comprise the PDCCH receiver that receives (monitors) the PDCCH. The UE 202 may also comprise the PUSCH transmitter that transmits, in the subframe n, the PUSCH corresponding to the PDCCH in subframe n−k upon the detection of the PDCCH in the subframe n−k. The eNB 260 may also comprise the PUSCH receiver configured to receive, in the subframe n, the PDSCH.

In a case that the PUSCH is scheduled by a PDCCH in common search space, the PUSCH in the subframe n corresponds to the PDCCH in subframe n−$k_1$. In a case that the PUSCH is scheduled by a PDCCH in UE-specific search space, the PUSCH in the subframe n corresponds to the PDCCH in subframe n−$k_2$, where the $k_2$ is smaller than the $k_1$. Moreover, if the UE 202 is not configured with the short processing time, and if the PUSCH in the subframe n corresponds to the PDCCH in the subframe n−k, where k is equal to the $k_1$.

In yet another example, the eNB 260 and the UE 202 may have the following structures to support the approach 1 for UL HARQ RTT reduction. The eNB 260 may comprise a higher-layer processor 223a that configures, for the UE 202, a short processing time for UL HARQ. The UE 202 may comprise a higher-layer processor 223b that configures the short processing time. The UE 202 may also comprise the PUSCH transmitter that transmits, in the subframe n, the PUSCH corresponding to the PDCCH upon the detection of the PDCCH. The eNB 260 may also comprise the PUSCH receiver configured to receive, in the subframe n, the PDSCH corresponding to the PDCCH. The eNB 260 may also comprise the control channel transmitter that transmits, in a subframe n+k, a PHICH. The UE 202 may also comprise the control channel receiver that receives (monitors), in the subframe n+k, the PHICH.

In a case that the PUSCH is scheduled by a PDCCH in common search space, the k is equal to $k_1$. In a case that the PUSCH is scheduled by a PDCCH in UE-specific search space, the k is equal to $k_2$, where the $k_2$ is smaller than the $k_1$. Moreover, if the UE 202 is not configured with the short processing time, and if the PHICH in the subframe n+k corresponds to the PUSCH in the subframe n, the k is equal to $k_1$.

It should be noted that, although "k" is used multiple times in the above explanations, its values could change according to the context and is not necessarily the same. Similarly, although "n" is used multiple times in the above explanations, its values could change according to the context and is not necessarily the same.

Figure 3:
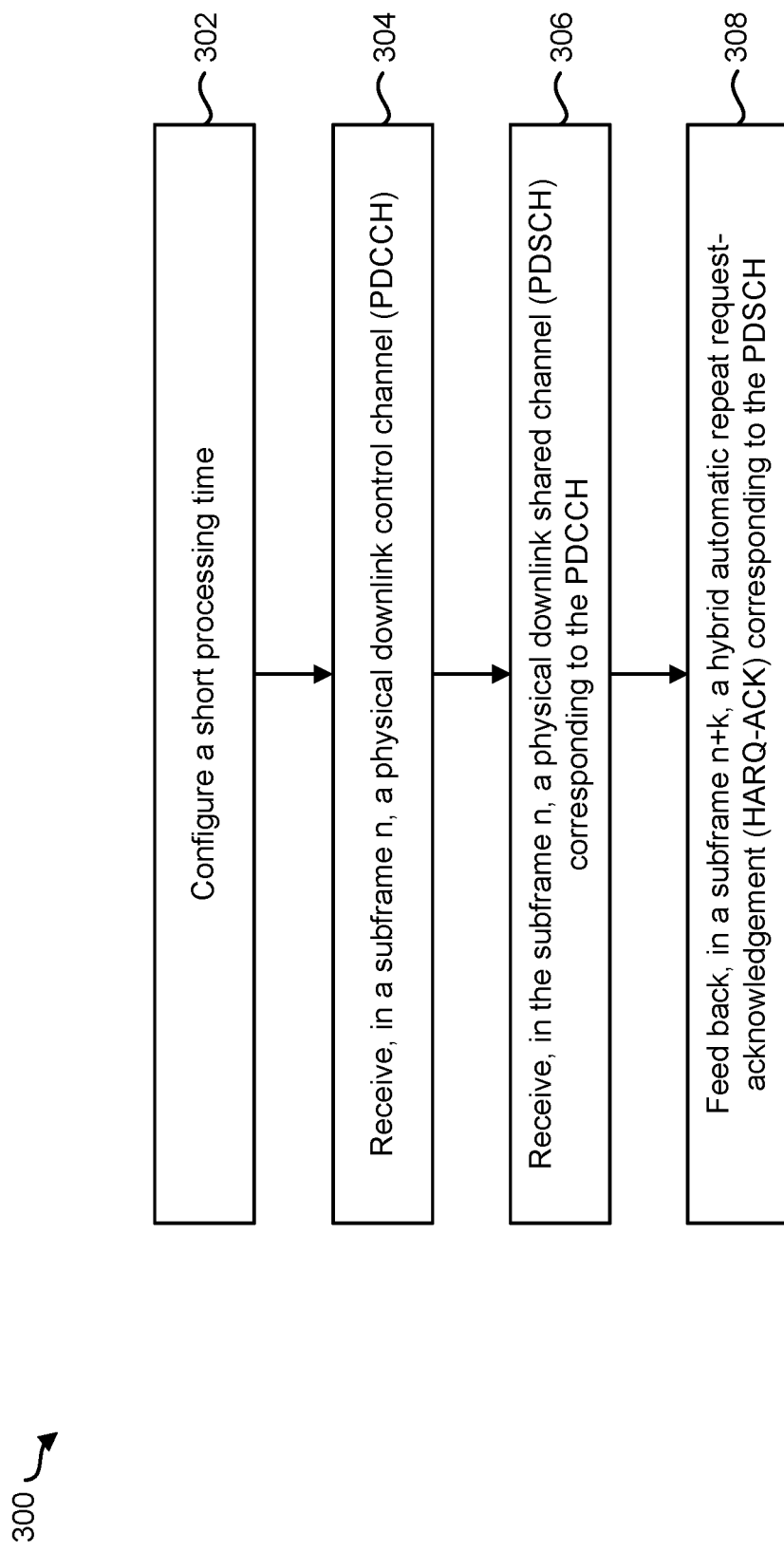
FIG. 3 is a flow diagram illustrating a method by a UE.

FIG. 3 is a flow diagram illustrating a method 300 by a UE 102. The UE 102 may communicate with one or more eNBs 160 in a wireless communication network. In one implementation, the wireless communication network may include an LTE network.

The UE 102 may configure 302 a short processing time. For example, the UE 102 may configure 302 a shortened RTT for a serving cell on the basis of a message from the eNB 160. The configurations may be performed by a higher layer processor 223b.

The UE 102 may receive 304, in a subframe n, a physical downlink control channel (PDCCH). For example, the UE 102 may include a control channel receiver 251 that receives 304 (monitors), in the subframe n, the PDCCH The UE 102 may receive 306, in the subframe n, a physical downlink shared channel (PDSCH) corresponding to the PDCCH. For example, the UE 102 may include a shared channel receiver 257 that receives, in the subframe n, the corresponding PDSCH upon the detection of the PDCCH.

The UE 102 may feed back 308, in a subframe n+k, a hybrid automatic repeat request-acknowledgement (HARQ-ACK) corresponding to the PDSCH. For example, the UE 102 may include an uplink transmitter 259 that feeds back 308, in the subframe n+k, a HARQ-ACK indicating the result of the PDSCH decoding (ACK for successful decoding; NACK for unsuccessful decoding).

In a case that the PDCCH is a PDCCH in common search space, the k may be equal to $k_1$. In a case that the PDCCH is a PDCCH in UE-specific search space, the k may be equal to $k_2$. The $k_2$ may be smaller than the $k_1$.

Figure 4:
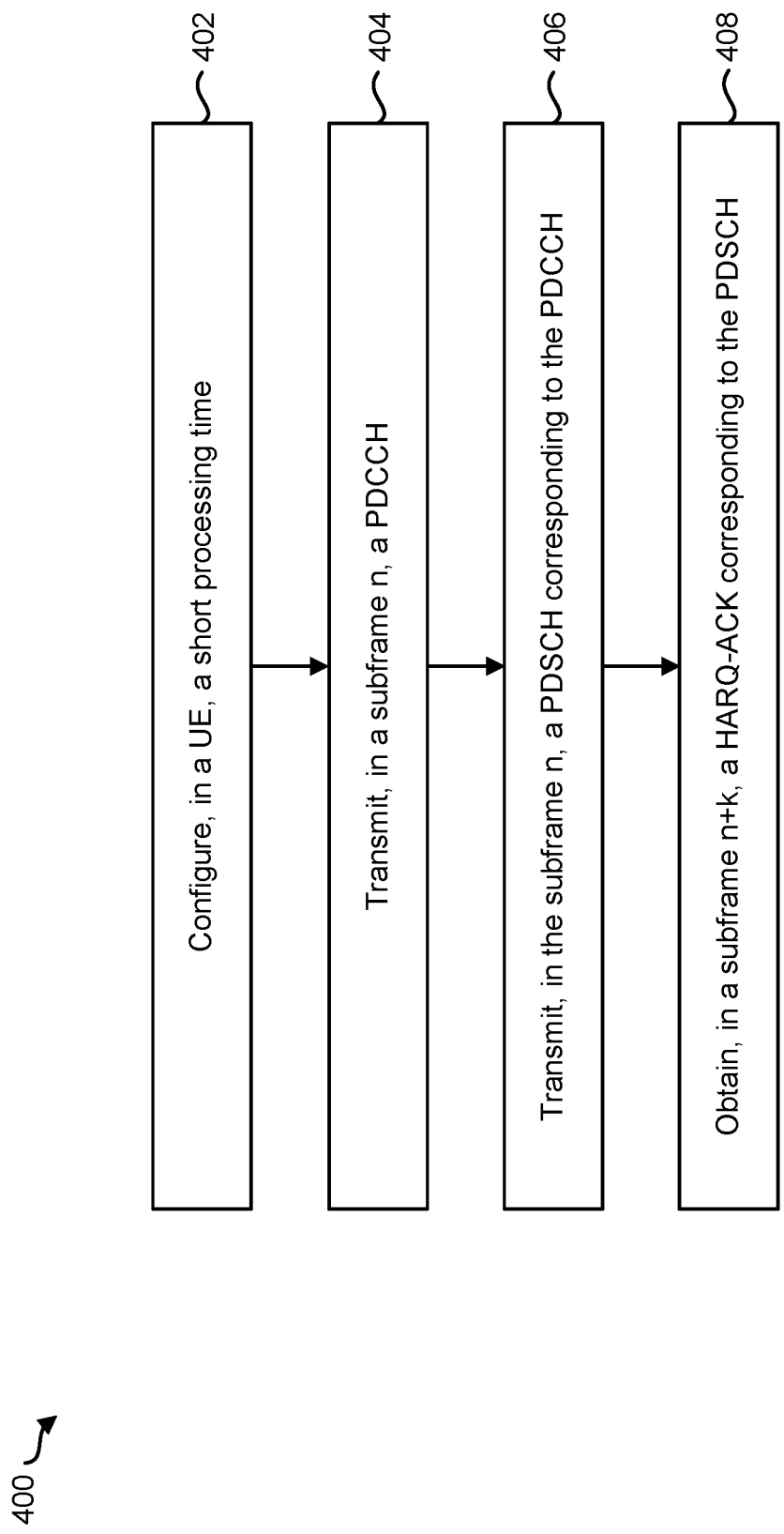
FIG. 4 is a flow diagram illustrating a method by an eNB.

FIG. 4 is a flow diagram illustrating a method 400 by an eNB 160. The eNB 160 may communicate with one or more UEs 102 in a wireless communication network. In one implementation, the wireless communication network may include an LTE network.

The eNB 160 may configure 402, in a UE 102, a short processing time. For example, the eNB 160 may include a higher-layer processor 223a that configures, for the UE 102, a short processing time for the DL HARQ.

The eNB 160 may transmit 404, in a subframe n, a PDCCH. For example, the eNB 160 may include a PDCCH transmitter (e.g., control channel transmitter 227) that transmits PDCCH in a subframe n.

The eNB 160 may transmit 406, in the subframe n, a PDSCH corresponding to the PDCCH. For example, the eNB 160 may include a PDSCH transmitter (e.g., shared channel transmitter 233) configured to transmit, in the subframe n, the PDSCH corresponding to the PDCCH.

The eNB 160 may obtain 408, in a subframe n+k, a HARQ-ACK corresponding to the PDSCH. For example, the eNB 260 may comprise the uplink receiver 239 that obtains, in the subframe n+k, the HARQ-ACK from the UE 102.

In a case that the PDCCH is a PDCCH in common search space, the k may be equal to $k_1$. In a case that the PDCCH is a PDCCH in UE-specific search space, the k may be equal to $k_2$. The $k_2$ may be smaller than the $k_1$.

Figure 5:
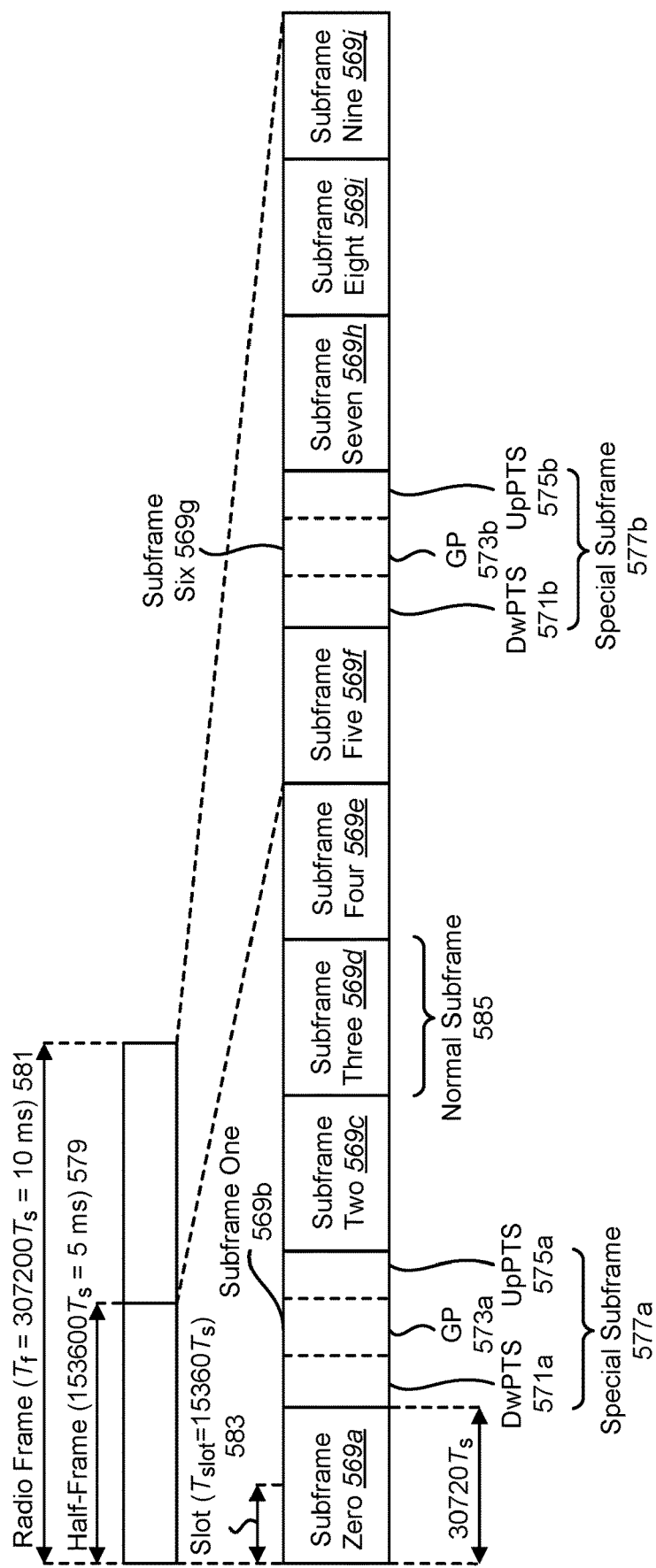
FIG. 5 is a diagram illustrating one example of a radio frame that may be used in accordance with the systems and methods disclosed herein.

FIG. 5 is a diagram illustrating one example of a radio frame 581 that may be used in accordance with the systems and methods disclosed herein. This radio frame 581 structure illustrates a TDD structure. Each radio frame 581 may have a length of $T_f = 307200 \cdot T_s = 10$ ms, where $T_f$ is a radio frame 581 duration and $T_s$ is a time unit equal to $$\frac{1}{(15000 \times 2048)}$$

seconds. The radio frame 581 may include two half-frames 579, each having a length of $153600 \cdot T_s = 5$ ms. Each half-frame 579 may include five subframes 569a-e, 569f-j each having a length of $30720 \cdot T_s = 1$ ms. Each subframe 569 may include two slots 583 each having a length of $15360 \cdot T_s = 1/2$ ms.

TDD UL/DL configurations 0-6 are given below in Table 9 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 9 below. In Table 9, "D" denotes a downlink subframe, "S" denotes a special subframe and "U" denotes a UL subframe.

TABLE 9

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 9 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 10 (from Table 4.2-1 of 3GPP TS 36.211) subject to the total length of DwPTS, GP and UpPTS being equal to $30720 \cdot T_s = 1$ ms. In Table 10, "cyclic prefix" is abbreviated as "CP" and "configuration" is abbreviated as "Config" for convenience.

TABLE 10

| | Normal CP in downlink | | | Extended CP in downlink | | |
| | | UpPTS | | | UpPTS | |
| Special Subframe Config | DwPTS | Normal CP in uplink | Extended CP in uplink | DwPTS | Normal CP in uplink | Extended CP in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 569 that may be used include a downlink subframe, an uplink subframe and a special subframe 577. In the example illustrated in FIG. 5, which has a 5 ms periodicity, two standard special subframes 577a-b are included in the radio frame 581. The remaining subframes 569 are normal subframes 585.

The first special subframe 577a includes a downlink pilot time slot (DwPTS) 571a, a guard period (GP) 573a and an uplink pilot time slot (UpPTS) 575a. In this example, the first standard special subframe 577a is included in subframe one 569b. The second standard special subframe 577b includes a downlink pilot time slot (DwPTS) 571b, a guard period (GP) 573b and an uplink pilot time slot (UpPTS) 575b. In this example, the second standard special subframe 577b is included in subframe six 569g. The length of the DwPTS 571a-b and UpPTS 575a-b may be given by Table 4.2-1 of 3GPP TS 36.211 (illustrated in Table 10 above) subject to the total length of each set of DwPTS 571, GP 573 and UpPTS 575 being equal to $30720 \cdot T_s = 1$ ms.

Each subframe i 569a-j (where i denotes a subframe ranging from subframe zero 569a (e.g., 0) to subframe nine 569j (e.g., 9) in this example) is defined as two slots, 2i and 2i+1 of length $T_{slot} = 15360 \cdot T_s = 0.5$ ms in each subframe 569. For example, subframe zero (e.g., 0) 569a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 581 with 5 ms switch-point periodicity. In the case of 5 ms downlink-to-uplink switch-point periodicity, each half-frame 579 includes a standard special subframe 577a-b. In the case of 10 ms downlink-to-uplink switch-point periodicity, a special subframe 577 may exist in the first half-frame 579 only.

Subframe zero (e.g., 0) 569a and subframe five (e.g., 5) 569f and DwPTS 571a-b may be reserved for downlink transmission. The UpPTS 575a-b and the subframe(s) immediately following the special subframe(s) 577a-b (e.g., subframe two 569c and subframe seven 569h) may be reserved for uplink transmission. It should be noted that, in some implementations, special subframes 577 may be considered DL subframes in order to determine a set of DL subframe associations that indicate uplink control information (UCI) transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 6:
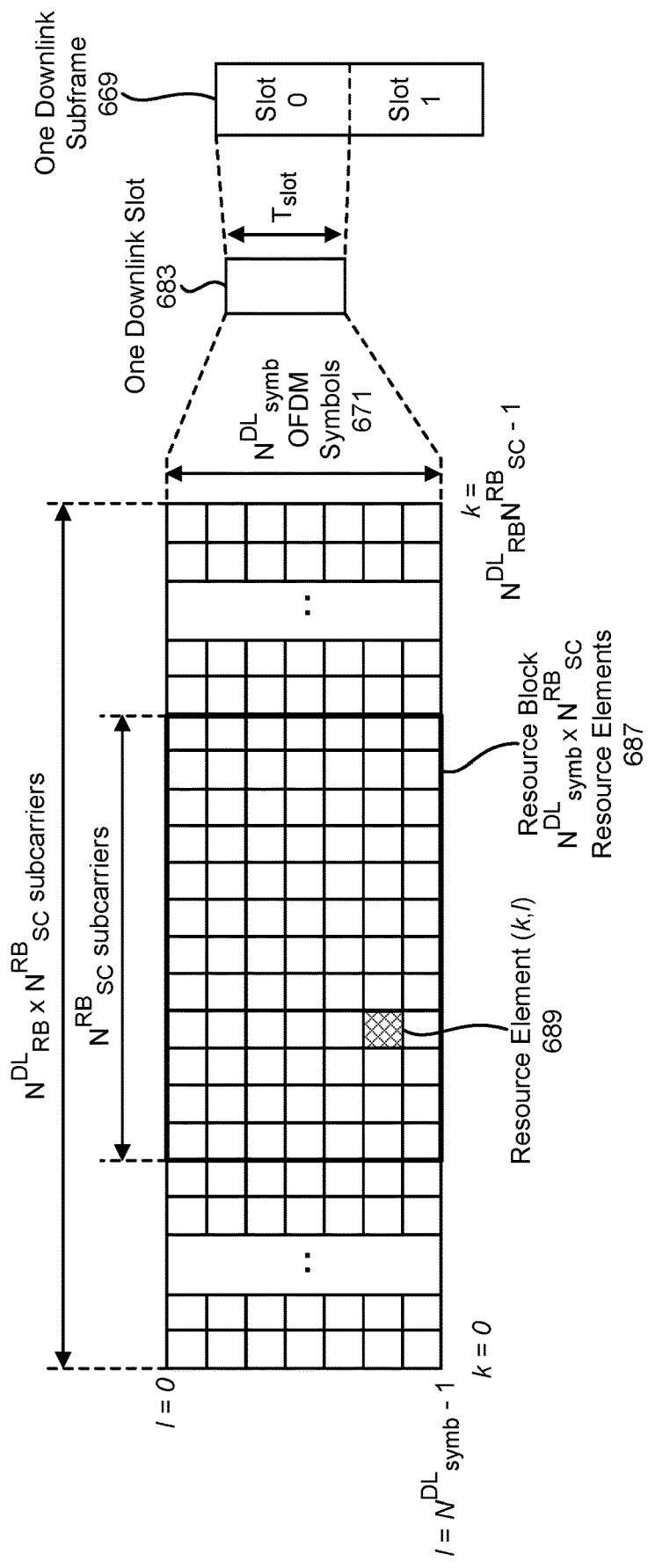
FIG. 6 is a diagram illustrating one example of a resource grid for the downlink (DL)

FIG. 6 is a diagram illustrating one example of a resource grid for the downlink. The resource grid illustrated in FIG. 6 may be utilized in some implementations of the systems and methods disclosed herein. More detail regarding the resource grid is given in connection with FIG. 1.

In FIG. 6, one downlink subframe 669 may include two downlink slots 683. $N^{DL}_{RB}$ is downlink bandwidth configuration of the serving cell, expressed in multiples of $N^{RB}_{sc}$, where $N^{RB}_{sc}$ is a resource block 687 size in the frequency domain expressed as a number of subcarriers, and $N^{DL}_{symb}$ is the number of OFDM symbols 1085 in a downlink slot 683. A resource block 687 may include a number of resource elements (RE) 689.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 689 may be the RE 689 whose index 1 fulfils $l \geq l_{data,start}$ and/or $l_{data,end} \geq l$ in a subframe.

Figure 7:
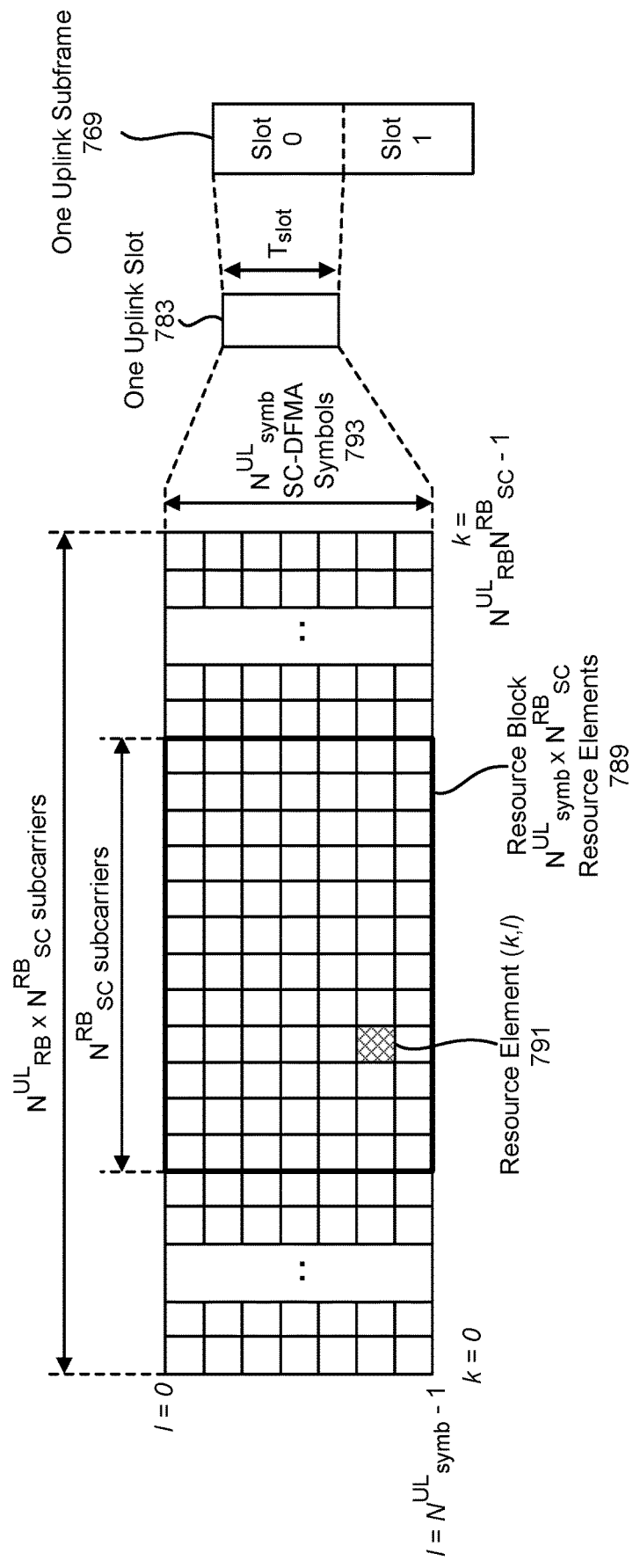
FIG. 7 is a diagram illustrating one example of a resource grid for the uplink (UL)

FIG. 7 is a diagram illustrating one example of a resource grid for the uplink. The resource grid illustrated in FIG. 7 may be utilized in some implementations of the systems and methods disclosed herein. More detail regarding the resource grid is given in connection with FIG. 1.

In FIG. 7, one uplink subframe 769 may include two uplink slots 783. $N^{UL}_{RB}$ is uplink bandwidth configuration of the serving cell, expressed in multiples of $N^{RB}_{sc}$, where $N^{RB}_{sc}$ is a resource block 789 size in the frequency domain expressed as a number of subcarriers, and $N^{UL}_{symb}$ is the number of SC-FDMA symbols 793 in an uplink slot 783. A resource block 789 may include a number of resource elements (RE) 791.

For a PCell, $N^{UL}_{RB}$ is broadcast as a part of system information. For an SCell (including an LAA SCell), $N^{UL}_{RB}$ is configured by a RRC message dedicated to a UE 102.

Figure 8:
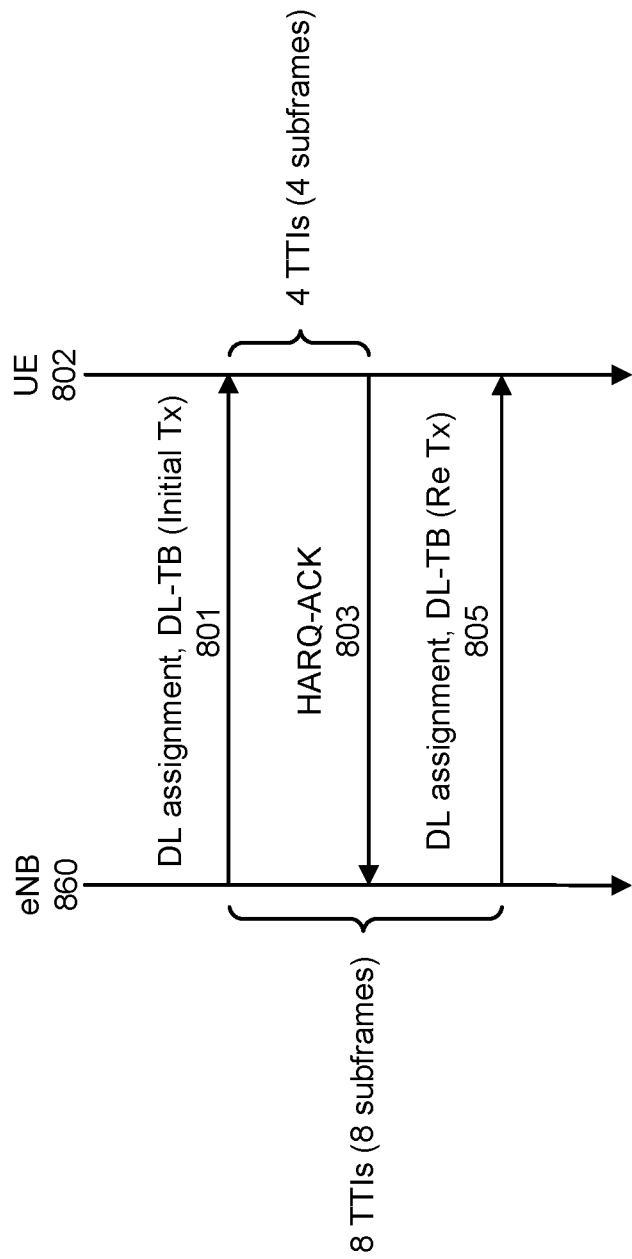
FIG. 8 illustrates an example of a retransmission cycle of a DL transport block (DL-TB)

FIG. 8 illustrates an example of a retransmission cycle of a DL transport block (DL-TB). When data transmission occurs in a higher layer at the eNB side, the eNB 860 may determine physical layer parameters (e.g., MCS, PRB assignment, etc.) for an initial transmission of the DL-TB. The eNB 860 may transmit 801 a DL assignment and the corresponding PDSCH carrying the DL-TB(s) in the same subframe.

If the UE 802 detects PDCCH or EPDCCH carrying the DL assignment, the UE 802 may attempt to decode DL-TB in the corresponding PDSCH. If the UE 802 succeeds to decode DL-TB, then the UE 802 may report 803 ACK as the HARQ-ACK in the subframe 4-TTI later than the subframe carrying the DL assignment and DL-TB. Otherwise, the UE 802 reports 803 NACK as the HARQ-ACK in that subframe.

When the eNB 860 receives NACK, the eNB 860 retransmits 805 the DL-TB in the subframe 4-TTI later than the subframe carrying HARQ-ACK. Similarly, the next retransmission may be performed in the subframe 8-TTI later than the subframe of the 1st retransmission. Eventually, the retransmission cycle is 8 TTIs. In other words, a given DL-TB may be transmitted in every 8 subframe at minimum as long as the UE 802 reports NACK for the DL-TB.

Therefore, from the HARQ-ACK feedback perspective, the HARQ-ACK in subframe n corresponds to PDSCH in subframe n−k (for FDD, k=4 for FDD; for TDD, k is determined depending on UL/DL association set defined for TDD). From the HARQ retransmission perspective, the HARQ RTT timer (i.e., the minimum amount of subframe(s) before a DL HARQ retransmission from the previous transmission) for a HARQ process is set to k+4 such that the UE 802 might not be expected to receive retransmission of the same transport block earlier than subframe n+4.

For each serving cell, in case of FDD configuration on the serving cell which carries the HARQ feedback for this serving cell the HARQ RTT timer is set to 8 subframes. For each serving cell, in case of TDD configuration on the serving cell which carries the HARQ feedback for this serving cell the HARQ RTT timer is set to k+4 subframes, where k is the interval between the downlink transmission and the transmission of associated HARQ feedback. Here "n" of "subframe n" expresses a subframe number, which is incremented with "1" subframe by subframe in time domain.

Figure 9:
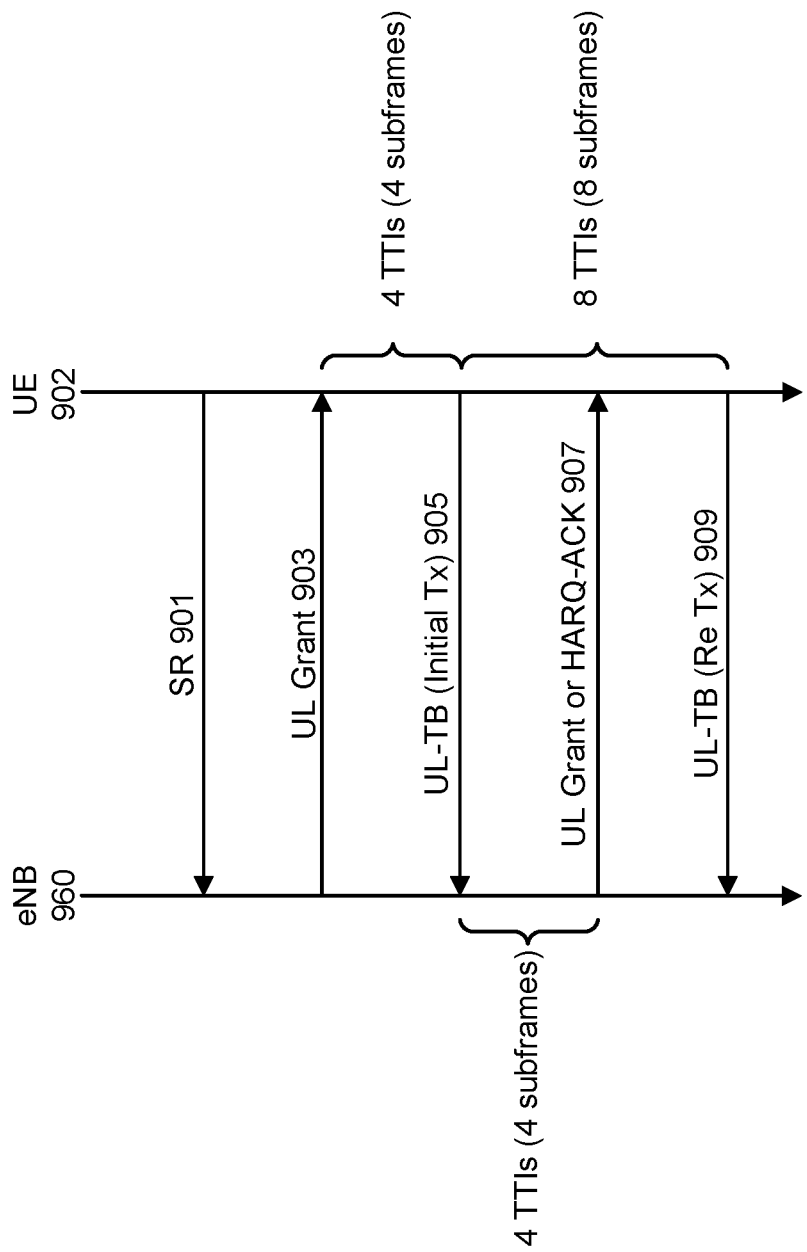
FIG. 9 illustrates an example of a retransmission cycle of a UL transport block (UL-TB)

FIG. 9 illustrates an example of a retransmission cycle of a UL transport block (UL-TB). When data transmission occurs in a higher layer at the UE side, the UE 902 may send 901 a scheduling request (SR) or may initiate a Random Access Channel (RACH) procedure instead of sending the SR.

If the eNB 960 receives the SR or finished the RACH procedure, the eNB 960 may determine physical layer parameters (e.g., MCS, PRB assignment, etc.) for an initial transmission of the UL-TB. The eNB 960 may transmit 903 an UL grant.

If the UE 902 detects PDCCH or EPDCCH carrying the UL grant, the UE 902 may transmit 905 PUSCH containing the UL-TB in the subframe 4-TTI later than the subframe carrying the UL grant. The eNB 960 may attempt to decode the UL-TB.

If the UE 902 succeeds to decode DL-TB, then the eNB 960 may report 907 ACK as the HARQ-ACK or may send another UL grant scheduling a new UL-TB in the subframe 4-TTI later than the subframe carrying the UL-TB. Otherwise, the eNB 960 may report NACK as the HARQ-ACK or may send another UL grant scheduling the same UL-TB in that subframe.

When the UE 902 receives NACK or another UL grant scheduling the same UL-TB, the UE 902 may re-transmit 909 the UL-TB in the subframe 4-TTI later than the subframe carrying HARQ-ACK or the UL grant. Similarly, the next retransmission may be performed in the subframe 8-TTI later than the subframe of the 1st retransmission. Eventually, the retransmission cycle is 8 TTIs. In other words, a given UL-TB may be transmitted in every 8 subframe at minimum as long as the eNB 960 reports NACK or sends an UL grant initiating a retransmission for the UL-TB.

Figure 10:
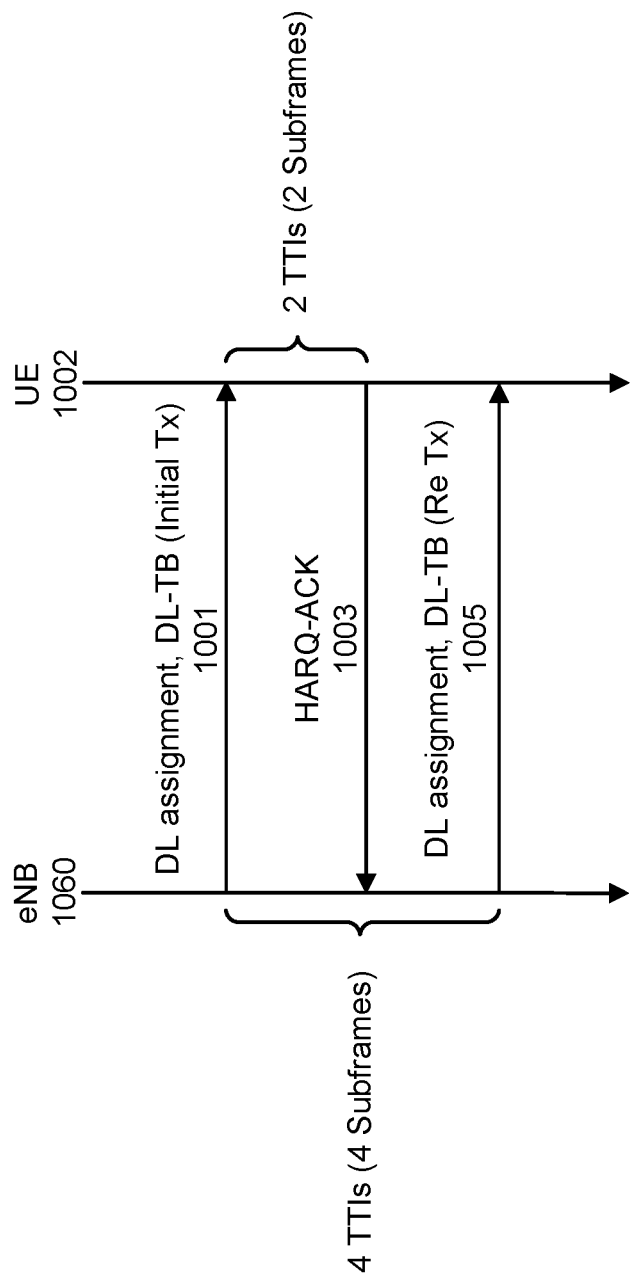
FIG. 10 illustrates an example of a retransmission cycle of a DL-TB with a shortened Round Trip Time (RTT) timeline.

FIG. 10 illustrates an example of a retransmission cycle of a DL-TB with a shortened Round Trip Time (RTT) timeline. When data transmission occurs in a higher layer at the eNB side, the eNB 1060 may determine physical layer parameters for an initial transmission of the DL-TB. The eNB 1060 may transmit 1001 a DL assignment and the corresponding PDSCH carrying the DL-TB(s) in the same subframe.

If the UE 1002 detects the PDCCH or EPDCCH carrying the DL assignment, the UE 1002 may attempt to decode DL-TB in the corresponding PDSCH. If the UE 1002 succeeds to decode DL-TB, then the UE 1002 may report 1003 ACK as the HARQ-ACK in the subframe 2-TTI later than the subframe carrying the DL assignment and DL-TB. Otherwise, the UE 1002 may report 1003 NACK as the HARQ-ACK in that subframe.

When the eNB 1060 receives NACK, the eNB 1060 may re-transmit 1005 the DL-TB in the subframe 2-TTI later than the subframe carrying HARQ-ACK. Similarly, the next retransmission may be performed in the subframe 4-TTI later than the subframe of the 1st retransmission.

Eventually, the retransmission cycle is 4 TTIs. In other words, a given DL-TB may be transmitted in every 4 subframe at minimum as long as the UE 1002 reports NACK for the DL-TB.

Figure 11:
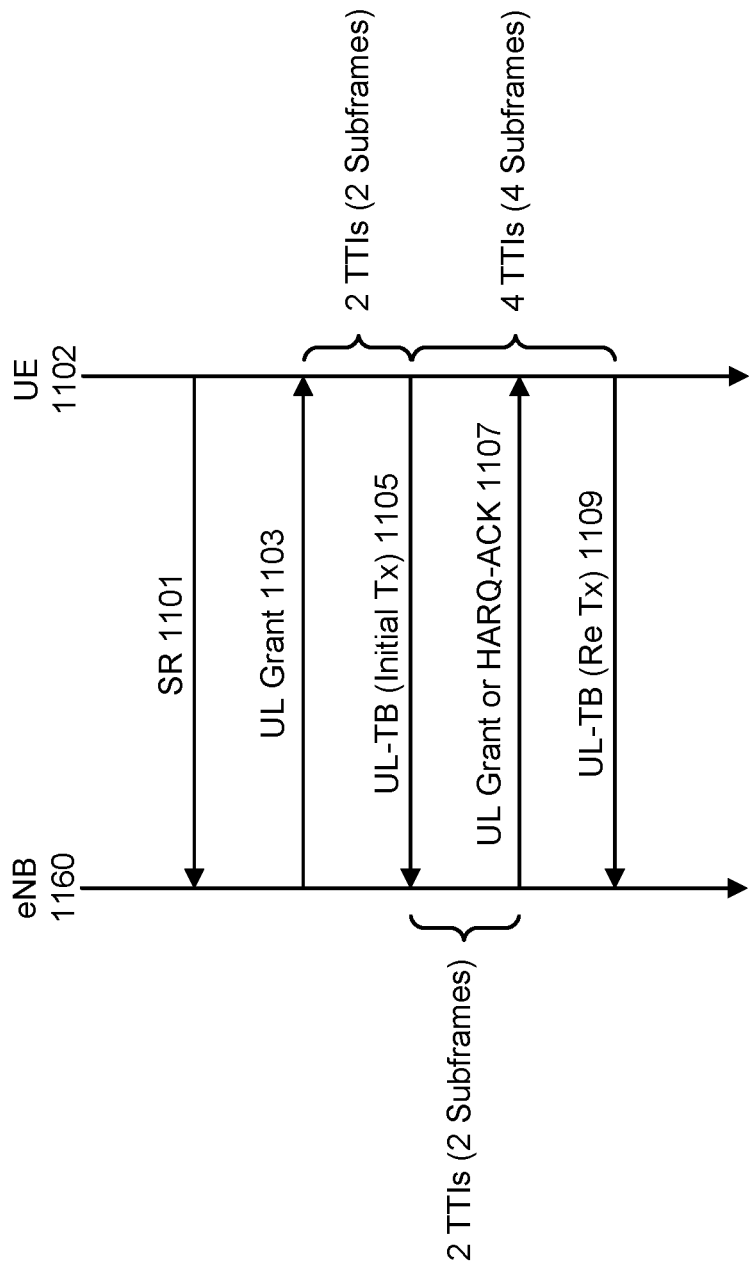
FIG. 11 illustrates an example of a retransmission cycle of a UL-TB with a shortened RTT timeline.

FIG. 11 illustrates an example of a retransmission cycle of a UL-TB with a shortened RTT timeline. When data transmission occurs in a higher layer at the UE side, the UE 1102 may send 1101 a scheduling request (SR) or may initiate a RACH procedure instead of sending SR.

If the eNB 1160 receives the SR or finished the RACH procedure, the eNB 1160 may determine physical layer parameters (e.g., MCS, PRB assignment, etc.) for an initial transmission of the UL-TB. The eNB 1160 may transmit 1103 a UL grant. If the UE 1102 detects a PDCCH or EPDCCH carrying the UL grant, the UE 1102 may transmit 1105 PUSCH containing the UL-TB in the subframe 2-TTI later than the subframe carrying the UL grant. The eNB 1160 may attempt to decode the UL-TB.

If the eNB 1160 succeeds to decode UL-TB, then the eNB 1160 may report 1107 ACK as the HARQ-ACK or may send another UL grant scheduling a new UL-TB in the subframe 2-TTI later than the subframe carrying the UL-TB. Otherwise, the eNB 1160 may report 1107 NACK as the HARQ-ACK or may send another UL grant scheduling the same UL-TB in that subframe.

When the UE 1102 receives NACK or another UL grant scheduling the same UL-TB, the UE 1102 may re-transmit 1109 the UL-TB in the subframe 2-TTI later than the subframe carrying the HARQ-ACK or the UL grant. Similarly, the next retransmission may be performed in the subframe 4-TTI later than the subframe of the 1st retransmission.

Eventually, the retransmission cycle is 4 TTIs. In other words, a given UL-TB may be transmitted in every 4 subframe at minimum as long as the eNB 1160 reports NACK or sends a UL grant initiating a retransmission for the UL-TB.

The shortened 2-TTI interval provides a RTT of 4 TTIs, with a 2 OFDM symbol TTI, the RTT is 8 symbols. If the interval is 3 TTIs, the RTT is 6 TTIs, with a 2 OFDM symbol TTI, the RTT is 12 symbols. Both of them are under 1 ms RTT.

Figure 12:
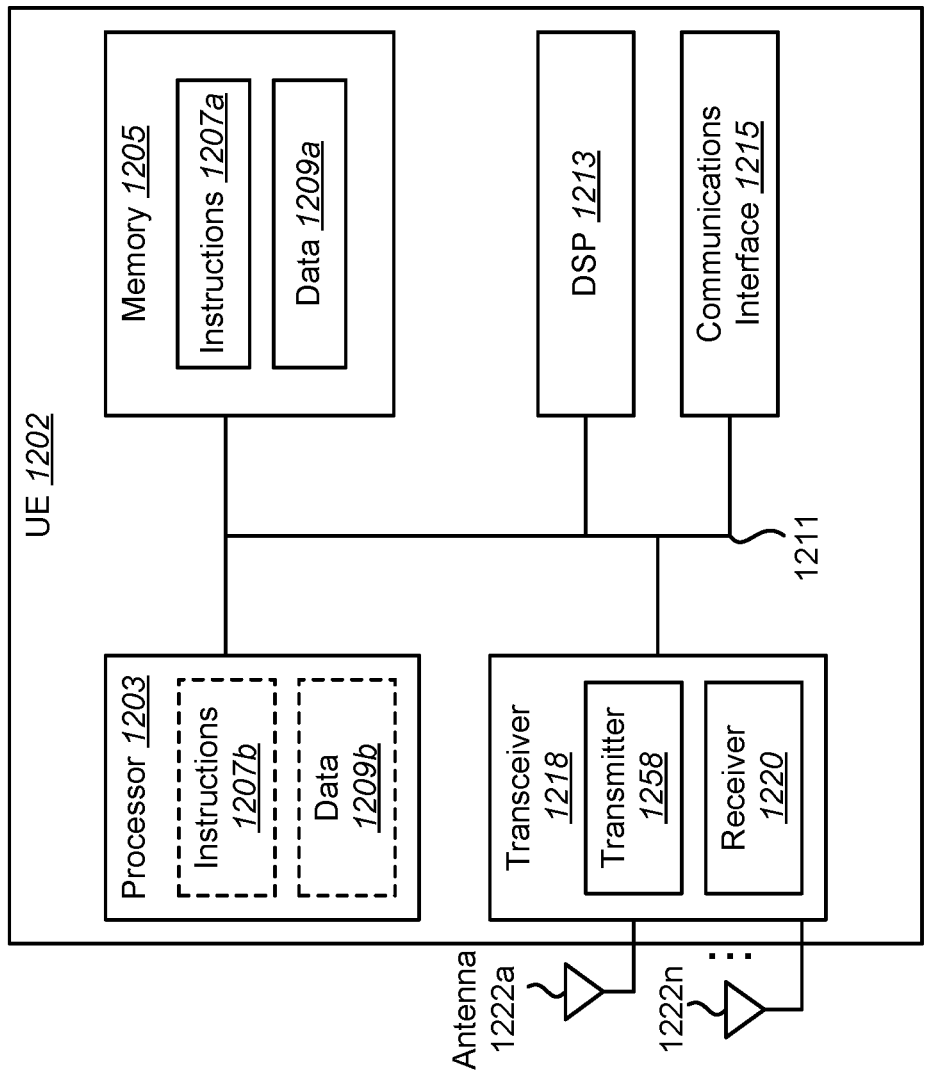
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1203 that controls operation of the UE 1202. The processor 1203 may also be referred to as a central processing unit (CPU). Memory 1205, which may include read-only memory (ROM), random access memory (RAM), a combination of the two or any type of device that may store information, provides instructions 1207a and data 1209a to the processor 1203. A portion of the memory 1205 may also include non-volatile random access memory (NVRAM). Instructions 1207b and data 1209b may also reside in the processor 1203. Instructions 1207b and/or data 1209b loaded into the processor 1203 may also include instructions 1207a and/or data 1209a from memory 1205 that were loaded for execution or processing by the processor 1203. The instructions 1207b may be executed by the processor 1203 to implement the method 300 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1211, which may include a power bus, a control signal bus and a status signal bus, in addition to a data bus. However, for the sake of clarity, the various buses are illustrated in FIG. 12 as the bus system 1211. The UE 1202 may also include a digital signal processor (DSP) 1213 for use in processing signals. The UE 1202 may also include a communications interface 1215 that provides user access to the functions of the UE 1202. The UE 1202 illustrated in FIG. 12 is a functional block diagram rather than a listing of specific components.

Figure 13:
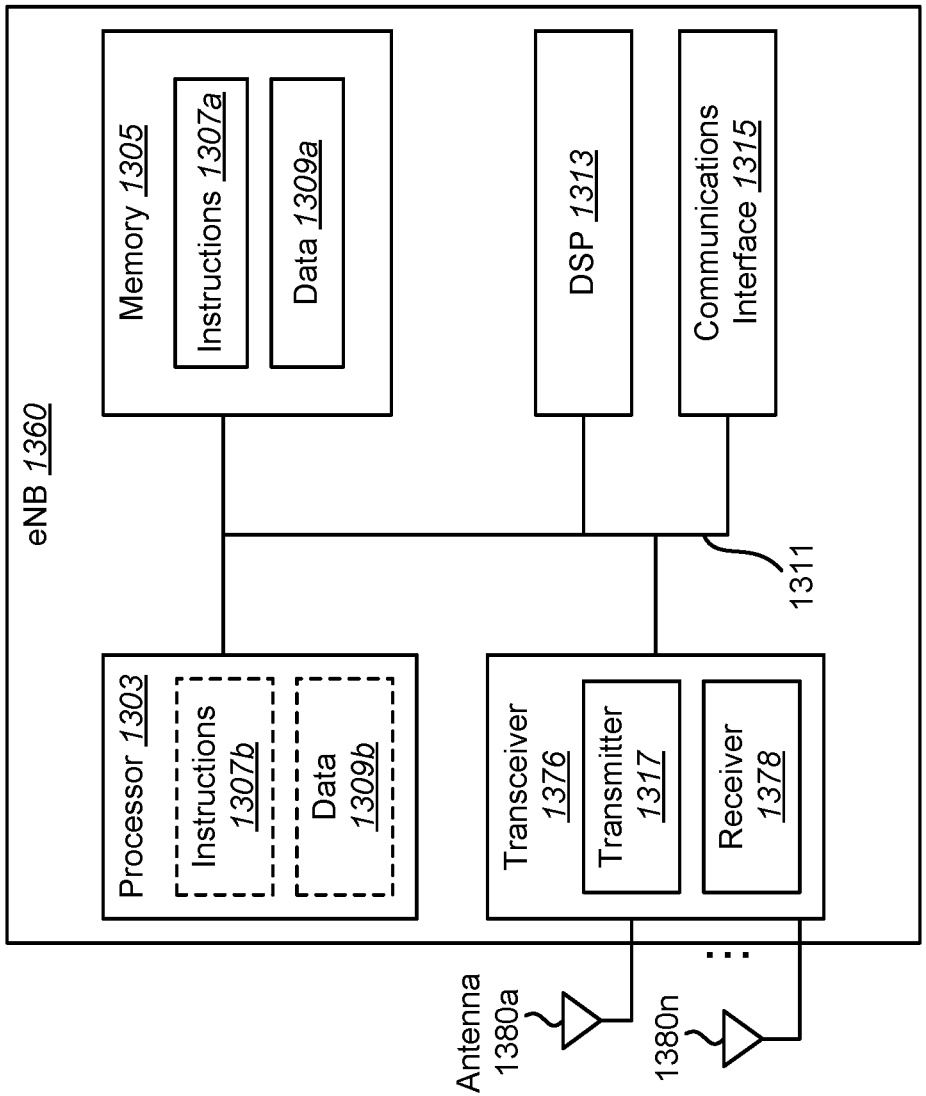
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1303 that controls operation of the eNB 1360. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the method 400 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the eNB 1360 are coupled together by a bus system 1311, which may include a power bus, a control signal bus and a status signal bus, in addition to a data bus. However, for the sake of clarity, the various buses are illustrated in FIG. 13 as the bus system 1311. The eNB 1360 may also include a digital signal processor (DSP) 1313 for use in processing signals. The eNB 1360 may also include a communications interface 1315 that provides user access to the functions of the eNB 1360. The eNB 1360 illustrated in FIG. 13 is a functional block diagram rather than a listing of specific components.

Figure 14:
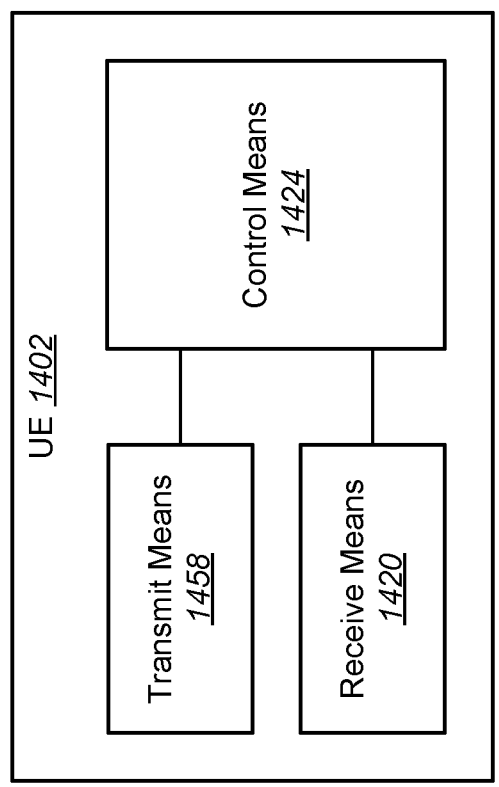
FIG. 14 is a block diagram illustrating one implementation of a UE in which systems and methods for low latency radio communications may be implemented.

FIG. 14 is a block diagram illustrating one implementation of a UE 1402 in which systems and methods for low latency radio communications may be implemented. The UE 1402 includes transmit means 1458, receive means 1420 and control means 1424. The transmit means 1458, receive means 1420 and control means 1424 may be configured to perform one or more of the functions described in connection with FIG. 1 above. FIG. 12 above illustrates one example of a concrete apparatus structure of FIG. 14. Other various structures may be implemented to realize one or more of the functions of FIG. 1. For example, a DSP may be realized by software.

Figure 15:
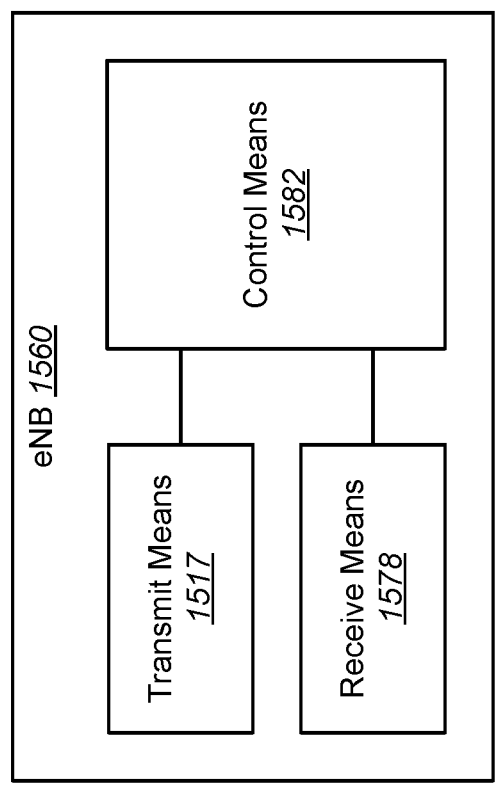
FIG. 15 is a block diagram illustrating one implementation of an eNB in which systems and methods for low latency radio communications may be implemented.

FIG. 15 is a block diagram illustrating one implementation of an eNB 1560 in which systems and methods for low latency radio communications may be implemented. The eNB 1560 includes transmit means 1517, receive means 1578 and control means 1582. The transmit means 1517, receive means 1578 and control means 1582 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, electrically erasable programmable read-only memory (EEPROM), CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A terminal apparatus comprising:
    a higher-layer processor configured to acquire information indicating a configuration of a short processing time;
    a physical downlink control channel (PDCCH) receiver configured to receive a PDCCH in a subframe n;
    a physical downlink shared channel (PDSCH) receiver configured to receive a PDSCH corresponding to the PDCCH; and
    an uplink transmitter configured to transmit a hybrid automatic repeat request-acknowledgement (HARQ-ACK) in a subframe n+k for the PDSCH, wherein
    in a case that the information is not acquired, the k is equal to $k_1$, in a case that the information is acquired and the PDCCH is a PDCCH in common search space, the k is equal to $k_1$, in a case that the information is acquired and the PDCCH is a PDCCH in UE-specific search space, the k is equal to $k_2$, and the $k_2$ is smaller than the $k_1$, wherein the $k_1$ and $k_2$ are positive values.

2. A base station apparatus comprising:

a higher-layer processor configured to send, for a terminal apparatus, information indicating a configuration of a short processing time;

a physical downlink control channel (PDCCH) transmitter configured to transmit a PDCCH in a subframe n;

a physical downlink shared channel (PDSCH) transmitter configured to transmit a PDSCH corresponding to the PDCCH; and an uplink receiver configured to obtain a hybrid automatic repeat request-acknowledgement (HARQ-ACK) in a subframe n+k for the PDSCH, wherein in a case that the information is not acquired, the k is equal to $k_1$, in a case that the information is acquired and the PDCCH is a PDCCH in common search space, the k is equal to $k_1$, in a case that the information is acquired and the PDCCH is a PDCCH in UE-specific search space, the k is equal to $k_2$, and the $k_2$ is smaller than the $k_1$, wherein the $k_1$ and $k_2$ are positive values.

3. A method for a terminal apparatus, the method comprising:

acquiring information indicating a configuration of a short processing time;

receiving a physical downlink control channel (PDCCH) in a subframe n;

receiving a physical downlink shared channel (PDSCH) corresponding to the PDCCH; and transmitting a hybrid automatic repeat request-acknowledgement (HARQ-ACK) in a subframe n+k for the PDSCH, wherein in a case that the information is not acquired, the k is equal to $k_1$, in a case that the information is acquired and the PDCCH is a PDCCH in common search space, the k is equal to $k_1$, in a case that the information is acquired and the PDCCH is a PDCCH in UE-specific search space, the k is equal to $k_2$, and the $k_2$ is smaller than the $k_1$, wherein the $k_1$ and $k_2$ are positive values.

4. A method for a base station apparatus, the method comprising:

sending, for a terminal apparatus, information indicating a configuration of a short processing time;

transmitting a physical downlink control channel (PDCCH) in a subframe n;

transmitting a physical downlink shared channel (PDSCH) corresponding to the PDCCH; and obtaining a hybrid automatic repeat request-acknowledgement (HARQ-ACK) in a subframe n+k for the PDSCH, wherein in a case that the information is not acquired, the k is equal to $k_1$, in a case that the information is acquired and the PDCCH is a PDCCH in common search space, the k is equal to $k_1$, in a case that the information is acquired and the PDCCH is a PDCCH in UE-specific search space, the k is equal to $k_2$, and the $k_2$ is smaller than the $k_1$, wherein the $k_1$ and $k_2$ are positive values.

* * * * *